(12) United States Patent
Bruheim et al.

(10) Patent No.: US 9,814,256 B2
(45) Date of Patent: Nov. 14, 2017

(54) METHOD FOR PROCESSING CRUSTACEANS TO PRODUCE LOW FLUORIDE/LOW TRIMETHYL AMINE PRODUCTS THEREOF

(71) Applicant: OLYMPIC SEAFOOD AS, Fosnavaag (NO)

(72) Inventors: Inge Bruheim, Volda (NO); Mikko Griinari, Espoo (FI); Jon Reidar Ervik, Aalesund (NO); Stig Rune Remoy, Fosnavag (NO); Even Remoy, Fosnavaag (NO); John Cameron, Fosnavaag (NO)

(73) Assignee: Rimfrost Technologies AS, Fosnavagg (NO)

( * ) Notice: Subject to any disclaimer, the term of this patent is extended or adjusted under 35 U.S.C. 154(b) by 420 days.

(21) Appl. No.: 14/370,324

(22) PCT Filed: Dec. 21, 2012

(86) PCT No.: PCT/IB2012/003004
§ 371 (c)(1),
(2) Date: Jul. 2, 2014

(87) PCT Pub. No.: WO2013/102792
PCT Pub. Date: Jul. 11, 2013

(65) Prior Publication Data
US 2015/0030751 A1    Jan. 29, 2015

Related U.S. Application Data

(63) Continuation-in-part of application No. 13/342,664, filed on Jan. 3, 2012, now Pat. No. 8,557,297, which is a continuation-in-part of application No. 13/063,488, filed as application No. PCT/NO2009/000322 on Sep. 14, 2009, now Pat. No. 8,758,829.

(51) Int. Cl.
| | | |
|---|---|---|
| *A23L 1/28* | (2006.01) | |
| *A23L 17/40* | (2016.01) | |
| *A23D 9/007* | (2006.01) | |
| *A23D 9/013* | (2006.01) | |
| *A23D 9/02* | (2006.01) | |
| *A23J 1/04* | (2006.01) | |
| *A23J 3/34* | (2006.01) | |
| *C11B 1/02* | (2006.01) | |
| *C11B 1/10* | (2006.01) | |
| *A23K 20/158* | (2016.01) | |
| *A23L 5/20* | (2016.01) | |
| *A23L 33/115* | (2016.01) | |
| *A23L 33/18* | (2016.01) | |
| *A23L 17/00* | (2016.01) | |

(52) U.S. Cl.
CPC ............... *A23L 17/40* (2016.08); *A23D 9/007* (2013.01); *A23D 9/013* (2013.01); *A23D 9/02* (2013.01); *A23J 1/04* (2013.01); *A23J 3/34* (2013.01); *A23K 20/158* (2016.05); *A23L 5/23* (2016.08); *A23L 5/25* (2016.08); *A23L 17/65* (2016.08); *A23L 33/115* (2016.08); *A23L 33/18* (2016.08); *C11B 1/025* (2013.01); *C11B 1/10* (2013.01); *C11B 1/104* (2013.01); *A23V 2002/00* (2013.01); *Y02P 20/544* (2015.11)

(58) Field of Classification Search
None
See application file for complete search history.

(56) References Cited

U.S. PATENT DOCUMENTS

2011/0224450 A1* 9/2011 Sclabos Katevas ... A23D 9/007
554/23

* cited by examiner

*Primary Examiner* — Kade Ariani
(74) *Attorney, Agent, or Firm* — Medlen & Carroll, LLP

(57) ABSTRACT

The present invention contemplates the creation of a low fluoride oil processed from a phospholipid-protein complex (PPC) formed immediately upon a (i.e., for example, krill) catch. Further, the oil may also have reduced trimethyl amine and/or trimethyl amino oxide content. The process comprises disintegrating the s into smaller particles, adding water, heating the result, adding enzyme(s) to hydrolyze the disintegrated material, deactivating the enzyme(s), removing solids from the enzymatically processed material to reduce fluoride content of the material, separating and drying the PPC material. Then, using extraction with supercritical $CO_2$ or supercritical dimethyl ether, and/or ethanol as solvents, krill oil, inter alia, is separated from the PPC. In the extraction the krill oil can be separated almost wholly from the feed material.

14 Claims, 4 Drawing Sheets

US 9,814,256 B2

METHOD FOR PROCESSING CRUSTACEANS TO PRODUCE LOW FLUORIDE/LOW TRIMETHYL AMINE PRODUCTS THEREOF

FIELD OF THE INVENTION

The invention relates to a method for processing crustaceans (i.e., for example, krill) rich in lipids to produce compositions low in fluoride, trimethyl amine and trimethyl amine oxide comprising phospholipids, proteinaceous nutrients and oil (i.e., for example, neutral lipids and/or triglycerides).

BACKGROUND OF THE INVENTION

The crustaceans, especially krill, represent a vast resource as biological material. The amount of Antarctic krill (*Euphausia superba*), depending on the calculation method and investigation, is roughly 1 to $2 \times 10^9$ tons and the possible weight of the annual catch is estimated at 5 to $7 \times 10^6$ tons. These small crustaceans, which live in the cold waters around the Antarctic, are interesting as a source for proteins, lipids such as phospholipids, poly-unsaturated fatty acids etc., chitin/chitosan, astaxanthin and other carotenoids, enzymes and other materials.

Several methods for isolating above-mentioned materials have been developed. One problem is that the products may contain unwanted trace material included in the exoskeleton (also called integument or cuticle) of the crustaceans. For example, krill accumulates fluoride in their exoskeleton, thereby increasing the fluoride amount of any produced material either through the inclusion of parts of the exoskeleton or through extraction processes not taking into account the transfer of fluoride to the final material. In this case free fluoride or loosely bound fluoride may diffuse from the exoskeletal material and into the further processed material, making the end product high in fluoride ions and/or fluorinated compounds.

Fluoride is a compound that in high concentrations is detrimental for the health of land-dwelling animals as well as all kind of fish and crustaceans and especially fresh-water fish species, since fluoride atoms have the tendency of entering into the bone structure of such organisms and creating fluorosis, or weakening of the bone structure similar in its effect to osteoporosis, but different since it is the bone structure itself, and not the porosity of the bone that is affected. Skeletal fluorosis is a condition characterized by skeletal abnormalities and joint pain. It is caused by pathological bone formation due to the mitogenic action of fluoride on osteoblasts. In its more severe forms, skeletal fluorosis causes kyphosis, crippling and invalidism. Secondary neurological complications in the form of myelopathy, with or without radiculopathy, may also occur. High fluoride intake has also been shown to be toxic to the male reproductive system in rat experiments, and in humans high fluoride intake and symptoms of skeletal fluorosis have been associated with decreased serum testosterone levels. Consequently, if krill material is used as a starting material for food or feed products, precautions have to be taken for removing fluoride through the processing steps. However, the diffusion of fluoride and the presence of miniscule particles of the exoskeleton represent a problem that is difficult to overcome when processing krill material in an industrial scale.

Polar lipids such as phospholipids are essential for cell membranes and are also called membrane lipids. For most known animal species the content of polar lipids is nearly constant. However, this does not hold for the Antarctic krill. The phospholipids content varies from 2% up to 10% depending on the season. The high content, e.g. more than 5%, of the phospholipids is in principle good, but means also a problem, because it may result in strong emulsions in industrial processes. The emulsions complicate the separation of the lipid and proteinaceous fractions in the processes, such as hydrolysis.

The krill oil is one the valuable products made from hills. It contains inter alia phospholipids, triglycerides and carotenoid astaxanthin while being essentially free of protein, carbohydrates and minerals. Different portions of the krill material are separated from each other by, inter alia: i) crushing krill mechanically; ii) pressing them, iii) hydrolysis with heat and enzymes; iv) centrifugal force in rotating devices; and v) solvent extraction.

What is needed in the art are significant improvements to these rather conventional approaches and are described within many embodiments of the present invention (infra). For example, a disintegrated raw crustacean material may be separated and/or extracted into various enriched low-fluoride, low trimethyl amine and/or low trimethyl amine oxide crustacean meal and/or oil compositions.

SUMMARY

The invention relates to a method for processing crustaceans (i.e., for example, krill) rich in lipids to produce compositions low in fluoride, trimethyl amine and trimethyl amine oxide comprising phospholipids, proteinaceous nutrients and oil (i.e., for example, neutral lipids and/or triglycerides).

In one embodiment, the present invention contemplates a crustacean oil composition comprising phospholipids and less than approximately 0.5 ppm fluoride. In one embodiment, the crustacean oil composition further comprises less than approximately 0.001% (w/w) trimethyl amine. In one embodiment, the crustacean oil composition further comprises less than approximately 0.02% (w/w) trimethyl amine oxide. In one embodiment, the phospholipids are between approximately 39-52 wt %, wherein said phospholipids comprise at least approximately 65% phosphatidylcholine and at least approximately 2.4 wt % lysophasphatidylcholine. In one embodiment, the crustacean oil further comprises triglycerides, neutral lipids, approximately 20-26 wt % Omega-3 (e.g., n-3) fatty acids, and at least approximately 0.8 wt % free fatty acids. In one embodiment, the crustacean oil composition is krill oil.

In one embodiment, the present invention contemplates a crustacean phospholipid-peptide complex (PPC) composition comprising a matrix of hydrolyzed protein, phospholipids and between approximately 200-500 ppm fluoride. In one embodiment, the phospholipids are at least 40 wt %. In one embodiment, the crustacean PPC composition further comprises approximately 0.044% (w/w) trimethyl amine and approximately 0.354% (w/w) trimethyl amine oxide. In one embodiment, the crustacean PPC composition further comprises at least 40% (w/w) triglycerides.

In one embodiment, the present invention contemplates a crustacean de-oiled phospholipid-peptide complex (PPC) composition comprising a matrix of hydrolyzed protein, between approximately 200-500 ppm fluoride, approximately 35% total fat, approximately 16.6% eicosapentaenoic acid, approximately 10.0% docosahexaenoic acid and at least 0.1 wt % free fatty acids. In one embodiment, wherein the total fat comprises less than 20% triglycerides, and approximately 69% other lipid components. In one embodiment, total fat comprises approximately 35.2% fatty acids, wherein approximately 30 wt % of said fatty acids are n-3 fatty acids. In one embodiment, the total lipids further comprise at least 68% phospholipids. In one embodiment, the de-oiled PPC further comprises approximately 2.2% lysophosphatidyl choline. In one embodiment, the de-oiled PPC further comprises approximately 115 mg/kg astaxanthin.

In one embodiment, the present invention contemplates a method for creating low fluoride crustacean compositions, comprising: a) disintegrating a crustacean catch into a material having a particle size ranging between approximately 1-25 millimeters; and b) separating said disintegrated crustacean material into a phospholipid-peptide complex (PPC) composition subfraction, wherein said subfraction comprises a fluoride content of less than 500 ppm. In one embodiment, the method further comprises extracting said PPC composition subfraction with a fluid comprising a solvent wherein a low fluoride oil is created, said oil having a fluoride content of less than 0.5 ppm. In one embodiment, the extracting further creates a low trimethyl amine/trimethyl amine oxide oil, wherein said trimethyl amine is less than approximately 0.001% (w/w) and said trimethyl amine oxide is less than approximately 0.02% (w/w). In one embodiment, the separating is performed without emulsification. In one embodiment, the solvent comprises a non-polar solvent. In one embodiment, the solvent comprises at least one polar solvent. In one embodiment, the solvent comprises said non-polar solvent and said at least one polar solvent. In one embodiment, the non-polar solvent includes, but is not limited to, supercritical carbon dioxide and supercritical dimethyl ether. In one embodiment, the polar solvent includes, but is not limited to, ethanol and acetone. In one embodiment, the method further comprises hydrolyzing said crustacean material before said separating. In one embodiment, the extracting further creates a de-oiled PPC composition. In one embodiment, the polar solvent separates a phospholipid composition and a protein hydrolysate composition from said de-oiled PPC composition. In one embodiment, the extracting comprises less than ten hours. In one embodiment, the extracting comprises less than five hours. In one embodiment, the extracting comprises less than two hours. In one embodiment, the crustacean material is krill material. In one embodiment, the separating comprises a centrifugal force of between approximately 1,000-1,800 g. In one embodiment, the separating comprises a centrifugal force of between approximately 5,000-10,000 g.

In one embodiment, the present invention contemplates a composition comprising a mixture of a low fluoride crustacean PPC and a low fluoride de-oiled PPC, wherein said fluoride level ranges between approximately 200-500 ppm. In one embodiment, the crustacean PPC is krill PPC. In one embodiment, the crustacean de-oiled PPC is krill de-oiled PPC. In one embodiment, the crustacean PPC and crustacean de-oiled PPC are in a 1:1 ratio. In one embodiment, the mixture comprises a milled fine powder. In one embodiment, the powder comprises a particle size of approximately 250 μm. In one embodiment, the composition comprises a peroxide level of less than 0.1%; (mEq/kg). In one embodiment, the composition comprises ananiside level of less than 0.1% (w/w). In one embodiment, the composition further comprises microencapsulated polyunsaturated Omega-3 fatty acids. In one embodiment, the composition further comprises zinc oxide. In one embodiment, the composition further comprises marine peptides. In one embodiment, the composition further comprises at least one supplemental amino acid.

In one embodiment, the present invention contemplates a method, comprising formulating a composition comprising a low fluoride crustacean PPC and a low fluoride crustacean de-oiled PPC, wherein said fluoride level ranges between approximately 200-500 ppm. In one embodiment, the method further comprises milling said composition into a powder. In one embodiment, the method further comprises tabletting said composition into a tablet. In one embodiment, the method further comprises encapsulating said composition into a capsule. In one embodiment, the method further comprises mixing said powder with a food product. In one embodiment, the formulating further comprises microencapsulated polyunsaturated Omega-3 fatty acids. In one embodiment, the formulating further comprises zinc oxide. In one embodiment, the formulating further comprises marine peptides. In one embodiment, the formulating further comprises at least one supplemental amino acid.

In one embodiment, the present invention contemplates a composition comprising a mixture of a low fluoride crustacean PPC and a crustacean protein hydrolysate, wherein said fluoride level ranges between approximately 200-500 ppm. In one embodiment, the crustacean PPC is krill PPC. In one embodiment, the crustacean protein hydrolysate is a krill protein hydrolysate. In one embodiment, the crustacean PPC and crustacean protein hydrolysate are in a 1:1 ratio. In one embodiment, the mixture comprises a milled fine powder. In one embodiment, the powder comprises a particle size of approximately 250 μm. In one embodiment, the composition comprises a peroxide level of less than 0.1%; (mEq/kg). In one embodiment, the composition comprises ananiside level of less than 0.1% (w/w). In one embodiment, the composition further comprises microencapsulated polyunsaturated Omega-3 fatty acids. In one embodiment, the composition further comprises zinc oxide. In one embodiment, the composition further comprises marine peptides. In one embodiment, the composition further comprises at least one supplemental amino acid.

In one embodiment, the present invention contemplates a method, comprising formulating a composition comprising a low fluoride crustacean PPC and a crustacean protein hydrolysate, wherein said fluoride level ranges between approximately 200-500 ppm. In one embodiment, the method further comprises milling said composition into a powder. In one embodiment, the method further comprises tabletting said composition into a tablet. In one embodiment, the method further comprises encapsulating said composition into a capsule. In one embodiment, the method further comprises mixing said powder with a food product. In one embodiment, the formulating further comprises microencapsulated polyunsaturated Omega-3 fatty acids. In one embodiment, the formulating further comprises zinc oxide. In one embodiment, the formulating further comprises marine peptides. In one embodiment, the formulating further comprises at least one supplemental amino acid.

In one embodiment, the present invention contemplates a phospholipid-peptide complex (PPC) composition comprising a range between approximately 40-50% lipids and less than 0.5 mg/kg fluoride. In one embodiment, the lipids comprise phospholipids. In one embodiment, the present invention contemplates an oil composition comprising approximately 400-500 grams/kg phospholipids, approximately 200-260 grams/kg Omega-3 fatty acids, less than 0.5 mg/kg fluoride, approximately 15 grams/kg lysophosphatidic acid, and less than approximately 8 grams/kg free fatty acids. In one embodiment, the present invention contemplates a de-oiled phospholipid-peptide complex (PPC) composition comprising approximately 300-400 grams/kg lipids, wherein approximately 0.1-1.0% are free fatty acids and a range between approximately 22-27% (w/w) that are Omega-3 fatty acids. In one embodiment, the lipids comprise phospholipids. In one embodiment, the present invention contemplates a crustacean lipid composition comprising at least 75% phospholipids. In one embodiment, the lipid composition comprises between approximately 75%-90% phospholipids. In one embodiment, the lipid composition comprises between approximately 75%-80% phospholipids. In one embodiment, the present invention contemplates a dried protein hydrolysate composition comprising approximately 70-80% protein, approximately 1.5-3.0% lipids, and approximately 5-7% ash.

In one embodiment, the present invention contemplates a method, comprising: a) providing; i) a hydrolyzed and disintegrated crustacean material; ii) at least one horizontal centrifuge capable of separating said hydrolyzed crustacean material; and iii) a fluid comprising a solvent; and b) separating said hydrolyzed crustacean material into a high fluoride solid fraction and a low fluoride hydrolyzed material fraction with a first horizontal centrifuge; c) separating said low fluoride hydrolyzed material fraction into a phospholipid-peptide complex (PPC) composition subfraction and a concentrated hydrolysate subfraction with a second horizontal centrifuge; and d) contacting said PPC composition subfraction with said fluid, wherein a low fluoride oil is extracted. In one embodiment, the disintegrated crustacean material has particle sizes between approximately 1-25 millimeters. In one embodiment, the first horizontal centrifuge separates said hydrolyzed crustacean material without emulisification. In one embodiment, the solvent comprises a non-polar solvent. In one embodiment, the non-polar solvent comprises supercritical $CO_2$. In one embodiment, the solvent comprises a polar solvent. In one embodiment, the polar solvent comprises ethanol. In one embodiment, the second horizontal centrifuge comprises an extended separation pathway. In one embodiment, the contacting is performed at a pressure of less than 300 bar. In one embodiment, the non-polar solvent further extracts a de-oiled PPC composition from said PPC composition subfraction. In one embodiment, the ethanol separates a phospholipid composition and a protein hydrolysate composition from said de-oiled PPC composition. In one embodiment, the de-oiled PPC is separated from the PPC in less than ten hours. In one embodiment, the de-oiled PPC is separated from the PPC in less than five hours. In one embodiment, the de-oiled PPC is separated from the PPC in less than two hours. In one embodiment, the hydrolyzed crustacean material comprises hydrolyzed krill material. In one embodiment, the separating said hydrolyzed crustacean material is performed at a centrifugal force of between approximately 1,000-1,800 g. In one embodiment, the separating said low fluoride hydrolyzed material fraction is performed at a centrifugal force of between approximately 5,000-10,000 g. In one embodiment, the method produces a phospholipid-peptide complex (PPC) composition comprising a range between approximately 40%-50% lipid and less than 0.5 mg/kg fluoride. In one embodiment, the method produces an oil composition comprising approximately 400-500 grams/kg phospholipids, approximately 200-260 grams/kg Omega-3 fatty acids, less than 0.5 mg/kg fluoride, approximately 15 grams/kg lysophosphatidic acid, and less than approximately 8 grams/kg free fatty acids. In one embodiment, the method produces a de-oiled phospholipid-peptide complex (PPC) composition comprising approximately 300-400 grams/kg lipids, wherein approximately 0.1-1.0% are free fatty acids and a range between approximately 20-28% (w/w) are Omega-3 fatty acids. In one embodiment, the method produces a crustacean lipid composition comprising at least 75% phospholipids. In one embodiment, the lipid composition comprises a range between approximately 75%-90% phospholipids. In one embodiment, the lipid composition comprises a range between approximately 75%-80% phospholipids. In one embodiment, the method produces a dried protein hydrolysate composition comprising approximately 70-80% protein, approximately 1.5-3.0% lipids, and approximately 5-7% ash.

In one embodiment, the present invention contemplates a system comprising: a) a solvent unit comprising at least one non-polar solvent inlet; b) an extraction tank unit in fluidic communication with the solvent unit, wherein the tank comprises an inlet configured to receive a phospholipid-protein complex composition; c) a separator unit comprising an outlet configured to release a low fluoride oil composition and residual co-solvent, wherein the separator is in fluidic communication with the tank; d) an absorbent unit in fluidic communication with the separator unit, wherein the absorbent unit is capable of recycling the non-polar solvent. In one embodiment, the non-polar solvent is a supercritical fluid. In one embodiment, the supercritical fluid comprises carbon dioxide. In one embodiment, the supercritical fluid comprises dimethyl ether. In one embodiment, the solvent unit further comprises a co-solvent inlet. In one embodiment, the co-solvent is a polar solvent. In one embodiment, the polar solvent is ethanol or acetone. In one embodiment, the at least one non-polar solvent inlet comprises an unused non-polar solvent inlet. In one embodiment, the at least one non-polar solvent inlet comprises a recycled non-polar solvent inlet. In one embodiment, the solvent unit further comprises a fluid pump. In one embodiment, the tank unit is pressurized by the fluid pump. In one embodiment, the solvent unit further comprises a heater. In one embodiment, the phospholipid-protein complex composition in the tank unit is heated by the heater. In one embodiment, the separator outlet is in fluid communication with an evaporator. In one embodiment, the separator further comprises a horizontal centrifuge. In one embodiment, the horizontal centrifuge is a decanter centrifuge having an extended separation pathway. In one embodiment, the phospholipid-protein complex composition is a low fluoride crustacean phospholipid-protein complex composition. In one embodiment, the low fluoride crustacean phospholipid-protein complex composition is a low fluoride krill phospholipid-protein complex composition.

In one embodiment, the present invention contemplates a method for processing crustaceans, especially krills, in which method the crustaceans are disintegrated into smaller particles, fresh water is added to the disintegrated material, the water with the disintegrated material is heated and enzyme(s) are added for hydrolyzing the disintegrated material and said enzyme(s) is/are deactivated, the method further comprising steps: a) removing solids from the hydrolyzed material to reduce fluoride content of the material; b) separating phospholipid-peptide complex material and concentrated hydrolysate fraction from each other; c) drying said phospholipid-peptide complex material; and d) dividing the drying result, or PPC, to components by extraction(s) using at least a supercritical $CO_2$ as solvent, wherein the processing of crustaceans is started as soon as a crustacean catch has been decked on a ship or boat. In one embodiment, the fluoride content solids are removed from the hydrolyzed material by a decanter. In one embodiment, the phospholipid-peptide complex material and concentrated hydrolysate fraction are separated from each other by a sedicanter with high centrifugal forces and long clarification/separation zones to avoid an emulsification. In one embodiment, the method further comprises using in the extraction ethanol as a co-solvent in addition to the supercritical $CO_2$ to separate: i) a krill oil consisting of phospholipids and triglycerides, or neutral oil, and ii) a protein hydrolysate from the PPC. In one embodiment, the pressure of the solvent being at most 300 bar. In one embodiment, the extraction includes two steps: i) first using only the supercritical $CO_2$ as solvent to separate de-oiled PPC from the PPC; and ii) second using only ethanol as solvent to separate phospholipids and protein hydrolysate from the de-oiled PPC. In one embodiment, the duration of the step when said de-oiled PPC is extracted from the PPC is at most three hours. In one embodiment, the method produces a phospholipid-peptide complex (PPC) composition comprising approximately 40%-50% lipid and approximately 0.5 mg/kg fluoride. In one embodiment, the lipid comprises phospholipids. In one embodiment, the method produces an oil composition comprising approximately 400-500 grams/kg phospholipids, approximately 200-260 grams/kg Omega-3 fatty acids, approximately 0.5 mg/kg fluoride, approximately 15 grams/kg lysophosphatidic acid, and less than approximately 8 grams/kg free fatty acids. In one embodiment, the method produces a de-oiled phospholipid-peptide complex (PPC) composition comprising approximately 300-400 grams/kg lipids, wherein approximately 0.1-1.0% are free fatty acids and approximately 22-27% (w/w) are Omega-3 fatty acids. In one embodiment, the method produces a crustacean phospholipid composition comprising approximately 75% polar lipids. In one embodiment, the method produces a dried protein hydrolysate composition comprising approximately 70-80% protein, approximately 1.5-3.0% lipids, and approximately 5-7% ash.

DEFINITIONS

The term "disintegrated material" as used herein refers to any biological material that has been subjected to a mechanical destruction and/or disruption that results in a composition having particle sizes of between approximately 1-25 millimeters, preferably between approximately 3-15 millimeters, more preferably between approximately 5-10 millimeters and most preferably approximately 8 millimeters.

The term "hydrolyzed material" as used herein refers to any biological material that has been subjected to high heat and/or enzymatic treatment. Such hydrolyzed materials would be expected to have phospholipid/peptide components that are physically separated from the components of the chitinous exoskeleton.

The term "crustacean" as used herein refers to any marine organism have a hard outside shell (e.g., a chitinous exoskeleton combined with a carbonate) encompassing a fleshy interior that is a living organism. More specifically, the crustaceans are usually considered a large class of mostly aquatic arthropods that have a chitinous or calcareous and chitinous exoskeleton, a pair of often much modified appendages on each segment, and two pairs of antennae. For example, a crustacean may include but not limited to, krill, lobsters, shrimps, crabs, wood lice, water fleas, and/or barnacles.

The term "horizontal centrifuge" refers to any device that is capable of rotating a mixture in the Z-plane (as opposed to the X-plane and/or Y-plane as with conventional centrifuges). This rotation is generated by a screw-type conveyor element aligned horizontally within a tube shaped enclosure. The induced centrifugal force then layers the heavier particles to the outside edges of the enclosure, while the lighter particles form layers closer to the center of the enclosure. Some horizontal centrifuges are modified to comprise an extended separation pathway and induce high gravitational forces (e.g., a sedicanter).

The term "polar solvent" as used herein refers to any compound, or compound mixture, that is miscible with water. Such polar solvent compounds include, but are not limited to, ethanol, propanol and/or ethyl acetate.

The term "non-polar solvent" as used herein refers to any compound, or compound mixture, that is not miscible with water. Such non-polar solvent compounds include, but are not limited to, hexane, pentane, dimethyl ether and/or $CO_2$. Either dimethyl ether or $CO_2$ may be used in a supercritical phase.

The term "supercritical" refers to any mixture comprising a chemical (e.g., for example, carbon dioxide ($CO_2$) or dimethyl ether) in a fluid state while held at, or above, its critical temperature and critical pressure where its characteristics expand to fill a container like a gas but with a density like that of a liquid. For example, carbon dioxide becomes a supercritical fluid above 31.1° C. and 72.9 atm/7.39 MPa. Carbon dioxide usually behaves as a gas in air at standard temperature and pressure (STP), or as a solid called dry ice when frozen. If the temperature and pressure are both increased from STP to be at or above the critical point for carbon dioxide, it can adopt properties midway between a gas and a liquid. As contemplated herein, supercritical $CO_2$ can be used as a commercial and industrial solvent during chemical extractions, in addition to its low toxicity and minimal environmental impact. The relatively low temperature of the process and the stability of $CO_2$ also allows most compounds (i.e., for example, biological compounds) to be extracted with little damage or denaturing. In addition, because the solubility of many extracted compounds in $CO_2$ may vary with pressure, supercritical $CO_2$ is useful in performing selective extractions.

The term "fluoride" as used herein interchangeably and refer to any compound containing an organofluoride and/or an inorganic fluoride.

The term "high fluoride solid fraction" as used herein refers to a composition containing the vast majority of a crustacean's exoskeleton following a low g-force (e.g., between approximately 1,000-1,800 g) horizontal centrifugation separation of a hydrolyzed and disintegrated crustacean material. This fraction contains small particles of exoskeleton of the crustacean that retains the vast majority of fluoride (i.e., for example, between 50-95%) in these organisms.

The term "low fluoride" as used herein may refer to the product of any method and/or process that reduced the fluoride from the original material by approximately 10-fold (i.e., for example, from 5 ppm to 0.5 ppm). For example, 'a low fluoride crustacean phospholipid-protein complex' comprises ten-fold less fluoride than 'a low fluoride hydrolyzed and disintegrated crustacean material'.

The term "low fluoride hydrolyzed material fraction" as used herein refers to a composition containing the vast majority of a crustacean's fleshy internal material following a low g-force (e.g., between approximately 1,000-1,800 g) horizontal centrifugation separation of a hydrolyzed and disintegrated crustacean material. This fraction contains small particles of phospholipids, neutral lipids, proteins and/or peptides that is largely devoid of any fluoride (i.e., for example, between 5%-50% of the raw hydrolyzed and disintegrated material).

The term "a low fluoride phospholipid-peptide complex composition subfraction" as used herein refers to a low fluoride composition containing the vast majority of lipid material following a high g-force (e.g., between approximately 5,000-10,000 g) horizontal centrifugation separation of a low fluoride hydrolyzed material fraction.

The term "concentrated hydrolysate composition subfraction" as used herein refers to a low fluoride composition containing the vast majority of water soluble lean material following a high g-force (e.g., between approximately 5,000-10,000 g) horizontal centrifuge separation of a low fluoride hydrolyzed material fraction.

The term "low fluoride oil" as used herein refers to a lipid-rich composition created by the extraction of a phospholipid-peptide complex composition subfraction using a selective extraction process, such as with a supercritical carbon dioxide fluid. Such a process removes approximately ten-fold of the fluoride from the raw hydrolyzed and disintegrated crustacean material.

The term "de-oiled phospholipid-peptide complex" as used herein refers to a low fluoride composition containing the vast majority of dry matter composition created by the extraction of a phospholipid-peptide complex composition subfraction using selective extraction process, such as a supercritical carbon dioxide fluid. A de-oiled PPC generally comprises a reduced triglyceride content in comparison to PPC.

The term "phospholipid composition" as used herein refers to a low fluoride composition comprising a high percentage of polar lipids (e.g., approximately 75%) created by the extraction of a de-oiled phospholipid-peptide complex using a co-solvent, such as ethanol.

The term "protein hydrolysate" as used herein refers to a low fluoride composition comprising a high percentage of protein (e.g., approximately 70-80%) created by the extraction of a de-oiled phospholipid-peptide complex using a co-solvent, such as ethanol.

The term "immediately" as used herein refers to a minimum practical period between decking a crustacean catch in a trawl bag and/or net coupled with a direct transfer to a suitable disintegraor. For example, this minimum practical period should preferably not exceed 60 minutes, more preferred to not exceed 30 minutes, even more preferred to not exceed 15 minutes.

The term "hydrolysis" as used herein refers to any break and/or disruption made in a protein structure of a disintegrated crustacean material, wherein in the naturally occurring protein sequences become shorter (i.e., for example, by breaking peptide bonds of the amino acid sequence primary structure) and/or denatured (i.e., for example, an unfolding of the amino acid sequence secondary, tertiary and/or quaternary structure). This process may be controlled by hydrolytic enzyme(s). For example, one or more exogenous proteolytic enzymes (e.g. alkalase, neutrase, and enzymes derived from microorganisms or plant species) may be used in the process. Co-factors such as specific ions can be added depending on the used enzymes. The selected enzyme(s) can also be chosen for reducing emulsions caused by high content of phospholipids in the raw material. Besides the temperature, the hydrolysis takes place within optimal or near-optimal pH and sufficient time. For example, the exogenous enzyme alkalase the optimum pH is about 8, optimum temperature about 60° C. and the hydrolysis time 40-120 minutes.

The term "solvent unit" refers to any enclosed volume configure to heat and pressurize a mixture of supercritical carbon dioxide fluid and/or a co-solvent (e.g., ethanol). Such an enclosed volume may be constructed out of any suitable material including but not limited to metals (e.g., steel, aluminum, iron etc.), plastics (e.g., polycarbonate, polyethylene etc.), fiberglass (etc.).

The term "extraction tank" refers to any enclosed volume configured to withstand heat and pressure sufficient to perform lipid and protein extraction from a raw biomass using a supercritical carbon dioxide fluid. As designed, the extraction tank contemplated herein is configured such that the solvents containing the extracted lipids and proteins rise to the tank top for transfer to a separator unit. Such an enclosed volume may be constructed out of any suitable material including but not limited to metals (e.g., steel, aluminum, iron etc.), plastics (e.g., polycarbonate, polyethylene etc.), fiberglass (etc.).

The term "separator unit" refers to any enclosed volume configured with a centrifuge capable of separating the components of the extracted lipids and proteins received from an extraction tank. The respective extraction components exit the separator unit via outlet ports such that the remaining solvents (i.e., supercritical $CO_2$) are transferred to an absorbent unit for recycling. Such an enclosed volume may be constructed out of any suitable material including but not limited to metals (e.g., steel, aluminum, iron etc.), plastics (e.g., polycarbonate, polyethylene etc.), fiberglass (etc.).

The term "absorbent unit" refers to any enclosed volume configured with materials that will remove contaminants from a supercritical $CO_2$ fluid. Such materials may include, but are not limited to charchol, coal, purifying gases, plastic polymer resins and/or filtration cartridges comprising single or dual-flat extruded nets (Tenax UK LTD, Wrexham, North Wales LL13 9JT, UK). Such an enclosed volume may be constructed out of any suitable material including but not limited to metals (e.g., steel, aluminum, iron etc.), plastics (e.g., polycarbonate, polyethylene etc.), fiberglass (etc.).

The term "in fluidic communication" refers to any means by which a fluid can be transported from one location to another location. Such means may include, but are not limited to pipes, buckets and/or troughs. Such means may be constructed out of any suitable material including but not limited to metals (e.g., steel, aluminum, iron etc.), plastics (e.g., polycarbonate, polyethylene etc.), fiberglass (etc.).

DETAILED DESCRIPTION OF THE INVENTION

Figure 1:
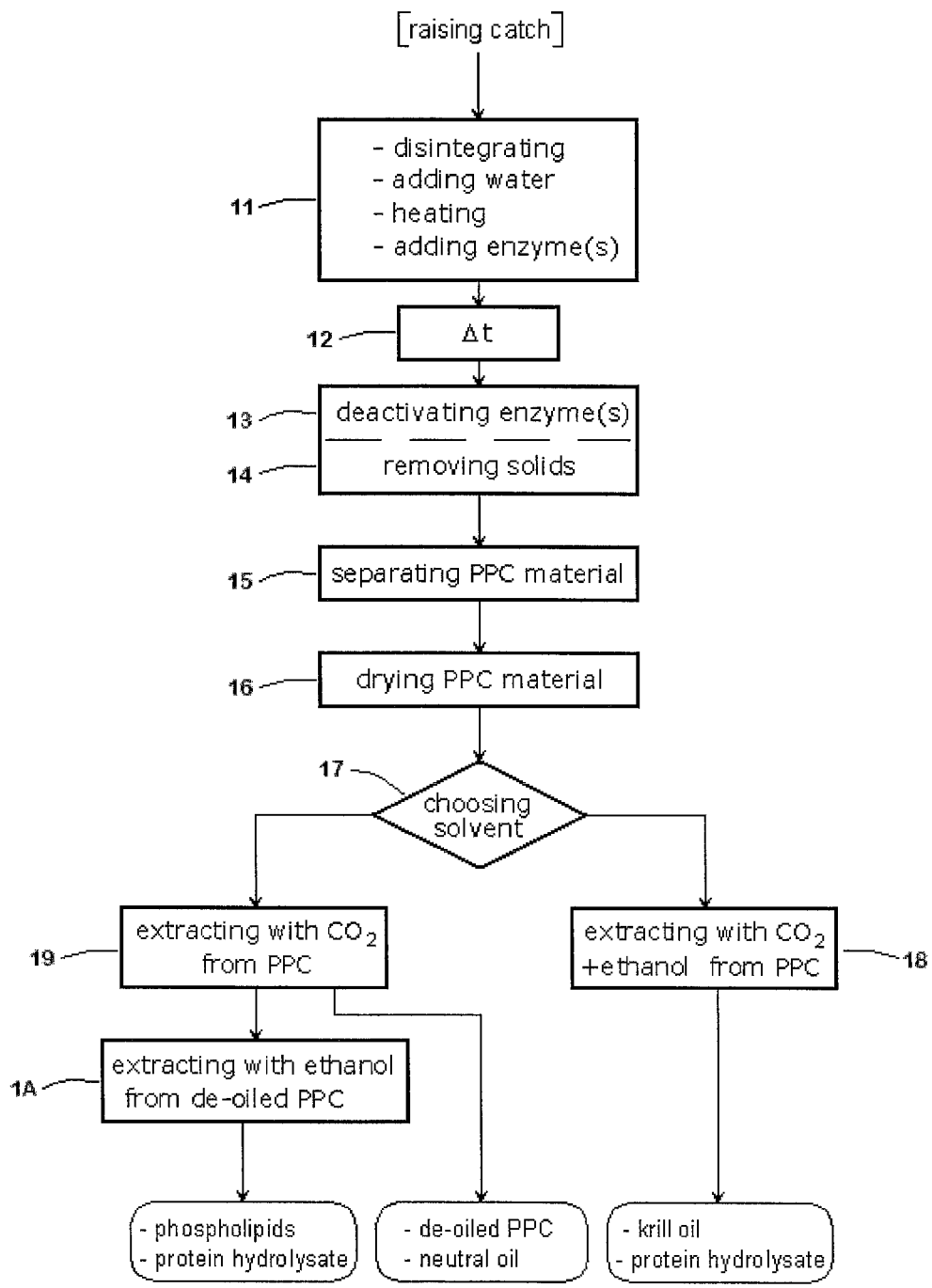
FIG. 1 presents a flow diagram of one embodiment of a method to produce a low fluoride crustacean material.

The invention relates to a method for processing crustaceans (i.e., for example, krill) rich in lipids to produce compositions low in fluoride, trimethyl amine and trimethyl amine oxide comprising phospholipids, proteinaceous nutrients and oil (i.e., for example, neutral lipids and/or triglycerides).

Krill oil comprises lipids extracted with solvents from krill biomass. Krill biomass can be either fresh, whole krill (WO2008/060163A1), frozen whole krill (Neptune Technologies & Bioresources Inc., Canada), lyophilized whole krill (JP2215351) or krill meal (US20080274203). Solvents used in extracting lipids from krill biomass have been reported as acetone+ethanol (WO2000/23546; WO2002/102394), ethanol+hexane (Enzymotec Ltd), ethanol alone (JP2215351; Aker BioMarine ASA, Norway) or supercritical $CO_2$+ethanol co-solvent (US2008/0274203; WO2008/060163). Solvent-free technology for obtaining krill oil has also been developed (US20110224450A1). Krill oil comprises a lipid fraction of raw krill biomass that is essentially free of protein, carbohydrates and/or minerals. Krill oil also comprises neutral lipids (e.g., mostly triglycerides), polar lipids (e.g., mostly phospholipids) and carotenoid astaxanthin. Although it is not necessary to understand the mechanism of an invention, it is believed that the lipid and/or fatty acid compositions of krill oil vary depending of the season.

In some embodiments, the present invention contemplates methods of processing crustacean biomass having unexpected findings including, but not limited to: i) removal of most of the exoskeleton from the crustacean biomass that results in low level of fluorides in a PPC composition and very low levels of fluoride in krill oil extracted from the PPC composition by a non-polar solvent (e.g., supercritical $CO_2$) and, optionally, a polar co-solvent (e.g., ethanol); ii) a level of fluorides in the crustacean oil that is less than 0.5 ppm in contrast to conventional krill oil with fluoride content of approximately 5-100 ppm; iii) crustacean oil extracted from PPC by supercritical CO, and ethanol co-solvent has a minimal brown color suggesting that minimal degradation of astaxanthin or formation of tertiary oxidation products has occurred; iv) a reduced dark/brown color as measured on a Hunter L* scale; v) a reduced pyrrole content as measured by absorption at 570 nm; v) minimal contents of free fatty acids (i.e., for example, 0.8 g/100 g of oil (~0.8% w/w)) and lysophosphatidylcholine (i.e., for example, 1.5 g/100 g of oil (~1.5% w/w)). These findings suggest that the lipids of crustacean biomass have undergone minimal hydrolysis during the initial processing steps producing PPC I. Historical Overview of Crustacean Processing Methods Publication GB 2240786 discloses a method for processing krill including removing a part of the fluoride content of krill. The removing is based on passing electric current through pulverized krill. However, fluoride-containing solid particles remain in the material.

Publication US 2011/0224450 (Sclabos Katevas et al., herein incorporated by reference) discloses a method for obtaining krill oil from whole raw krills using inter alia cooking, separating by decanter, and pressing. No solvents and extraction are used.

Publication WO 2008/060163 (Pronova Biopharma AS) discloses a method for obtaining krill oil using supercritical $CO_2$ and either ethanol, methanol, propanol or isopropanol as co-solvent. Fresh or pre-heated (about 90° C.) whole krills are used as the extraction feed material.

Publication WO 02/102394 (Neptune Technologies & Bioresources) discloses a method for obtaining krill oil using in different phases acetone and ethanol or e.g. ethyl acetate as solvents. Frozen whole krill is used as feed material.

Publication JP 2215351 (Taiyo Fishery) discloses a method for obtaining krill oil using ethanol as solvent. Lyophilized whole krills are used as feed material.

Publication US 2008/0274203 (Aker Biomarine ASA, Bruheim et al.)(herein incorporated by reference) discloses a method for obtaining krill oil from krill meal using supercritical fluid extraction in a two-stage process. Stage 1 removes the neutral lipid by extracting with neat supercritical $CO_2$ or $CO_2$ plus approximately 5% of a co-solvent. Stage 2 extracts the actual krill oils using supercritical $CO_2$ in combination with approximately 20% ethanol.

There are a number of problems associated with these conventionally known technologies of extracting krill lipids, including but not limited to: i) whole crustacean biomass contains high fluoride exoskeleton particles that results in the production of fluoride-contaminated crustacean oil; ii) crustacean oil having a brownish hue color may arise from exposing astaxanthin to excessive heat during crustacean biomass processing. Specifically, the brown color can arise from degradation of astaxanthin and/or from accumulation of the end products of non-enzymatic browning (e.g., Strecker degradation products or polymerized pyrroles). Although it is not necessary to understand the mechanism of an invention, it is believed that a brown color resulting from this non-enzymatic process results from oxidative degradation due to a reaction of secondary lipid oxidation products with amino groups from amino acids or proteins creating so-called tertiary oxidation products; freezing the crustacean biomass for transportation to an extraction plant can result in relative stability, but some changes in the product are known to occur over time, for example, one characteristic change in frozen krill is a partial hydrolysis of the lipids resulting in the accumulation of free fatty acids (FFA) arising from degradation of triglycerides, phospholipids and/or lysophospholipids, specifically lysophophatidylcholine (LPC), arising from hydrolysis of phosphatidylcholine; and iv) the use of heat and frozen storage can induce oxidation of lipids and proteins in crustacean biomass, where primary oxidation leads into formation of secondary oxidation products that are volatile and can be detected in krill oil as off-flavors or undesirable odor; and v) the separation of the krill oil from the feed material is quite inefficient, wherein only about a half of the oil can be extracted.

II. Production of Low Fluoride Crustacean Materials

In one embodiment, the present invention contemplates a method comprising forming a phospholipid-peptide complex (PPC) composition from a crustacean (i.e., for example, krill) immediately after the catch has been brought upon on board (e.g., decked) a boat and/or ship (i.e., for example, a fishing vessel). The process of creating the PPC composition comprises disintegrating the crustaceans into a disintegrated material comprising smaller particles (i.e., for example, between approximately 1-25 millimeters), adding water, heating the disintegrated material, adding enzyme(s) to hydrolyze the disintegrated material, deactivating the enzyme(s), removing solids (i.e., for example, exoskeleton, shell, and/or carapace) from the enzymatically processed material to reduce the fluoride content of the material, separating and drying the PPC composition. Preferably, the PPC composition is transferred to an on-shore facility (i.e., a fish oil extraction plant) where a low-fluoride crustacean oil is separated from the PPC composition using solvents including, but not limited to, supercritical $CO_2$ and/or ethanol. Using alternative extractions, de-oiled PPC compositions, phospholipids and/or protein hydrolysate compositions are also separated from the PPC composition.

An advantage of some embodiments of the invention is that these crustacean products, like krill oil, have a low fluoride content. This is due to the fact that the solid crusteacean exoskeletal particles (i.e., for example, shell and/or carapace) are effectively removed from mass to be processed.

Another advantage of the invention is that crustacean oil can be separated effectively, almost completely, from the disintegrated crustacean material (e.g., feed material) during the extraction. This is due to the fact that, in the extraction process with, for example, a supercritical $CO_2$ solvent, the feed material comprises a PPC composition. Although it is not necessary to understand the mechanism of an invention, it is believed that the phospholipids of the feed material are embedded in a matrix of hydrolyzed protein which means that the close association between the phospholipids and hydrophobic/phosphorylated proteins is broken thus facilitating the extraction of the lipids.

An advantage of the invention is that relatively low pressure and temperature can be used in the extraction, which means lower production costs.

A further advantage of the invention is that disposal of residual solvents, common when using other more conventional lipid solvents, is avoided when using supercritical $CO_2$ as a solvent.

A further advantage of the invention is that phosphatidylserine (PS), free fatty acids (FFA) and lysophosphocholine (LPC) contents are very low in the end products.

A further advantage of the invention is that a low fluoride crustacean oil product (i.e., for example, a low fluoride krill oil) has very little brown color. It is believed in the art that appearance of a brown color in crustacean oil indicates that unfavorable processes are occuring during the the manufacture of the feed material (e.g., a disintegrated crustacean material).

A. Processing of Crustaceans

The present invention provides an industrial method for processing catches of crustaceans comprising a number of steps beginning with a very early and substantially complete removal of the crustacean's exoskeleton (i.e., for example, the crust, carapace and/or shell). Although it is not necessary to understand the mechanism of an invention, it is believed that the crustacean exoskeleton comprises a vast majority of fluoride in the organism. Consequently, this step thereby results in a substantial removal of fluoride from the crustacean material. The method also uses longitudinal centrifugation techniques that prevents separation problems caused by emulsions when processing a raw material with high content of phospholipids.

The method according to the present invention is initiated immediately after decking a catch of crustacean. It is of importance that the method according to the present invention is initiated as soon as possible after the crustacean catch has been decked since fluoride starts to leak/diffuse immediately from the exoskeleton into the crustacean's flesh and juices.

When using the term "immediately" in connection with starting the process according to the present invention this relates to the period from decking the crustacean catch and to the initial disintegration of the crustacean. This period of time should be kept to a minimum, and should preferably not exceed 60 minutes, more preferred not exceed 30 minutes, even more preferred not exceed 15 minutes, and should include a direct transfer of the crustacean catch from the trawl bag and/or net to a suitable disintegrator. A disintegrator of the crustacean material may be a conventional pulping, milling, grinding or shredding machine.

The crustacean catch is initially loaded into a disintegration apparatus where the crustacean catch is subjected to pulping, milling, grinding and/or shredding to create a disintegrated crustacean material. The temperature of the disintegration process is around the ambient temperature of the water (i.e., for example, between approximately −2 and +1° C., but more preferably between approximately +0° C. to +6° C.) and may be performed by any convenient disintegration method. This disintegration process is also conventionally done by the previous known processing methods, and represents one of the obstacles according to the prior art because it produces large amounts of exoskeletal particles from the crustacean mixing in the milled material and producing a disintegrated paste with a high fluoride content. However, this high fluoride content is one of the reasons why the prior art processed crustacean material has limited applications and is less suitable for food, feed or corresponding food or feed additives compared to other marine raw materials e.g. pelagic fish.

According to the present invention the crustacean material is separated into a particle size suitable for a further separation step that does not interfer with the subsequent extraction steps. The disintegrating process is performed continuously and produces particle sizes up to 25 mm, a preferred particle size range is between approximately 0.5-10 mm and a more preferred size range is between approximately 1.0-8 mm.

Although it is not necessary to understand the mechanism of an invention, it is believed that this small particle size distribution represents one of advantages of the present invention because the fluoride has a tendency to leak out of the milled material and mingle with the rest of the raw material. However, this leaking process takes time and is not rapid enough to negatively impact a subsequent enzymatic hydrolysis step, provided the hydrolysis step is performed within specific parameters with respect to time and optimal, or near-optimal conditions, such as pH and temperature and optionally with the addition of co-factors such as specific ions depending on the used enzymes.

The temperature of the disintegrated material may, according to the present invention, be elevated to a temperature suitable for the subsequent enzymatic hydrolysis. Preferably, the temperature may be increased within seconds (e.g., 1-300 seconds, more preferred 1-100 seconds, even more preferred 1-60 seconds, most preferred 1-10 seconds) subsequent to the disintegrating step for reducing the processing time and thereby preventing diffusion of fluoride and for preparing the material for the enzymatic hydrolysis.

According to the present invention enzymes may be added directly to the disintegrated material or through the added water or both, before, during or after the disintegration process.

According to the present invention, exogenous proteolytic enzymes (e.g., alkalase, neutrase, enzymes derived from microorganisms including, but not limited to, *Bacillus subtilis* and/or *Aspergillus niger*, and/or or enzymes derived from plant species) may be added before, during or after the disintegration, and before, during or after the heating of the disintegrated material. The added enzyme(s) may be in the form of one single enzyme or a mixture of enzymes. The conditions of the hydrolysis should match the optimal hydrolytic conditions of the added enzyme(s) and the selection of optimal conditions for the selected exogenous hydrolytic enzyme(s) is known to the person skilled in the art. As an example, the exogenous enzyme alkalase having a pH optimum of about 8, a temperature optimum of 60° C. and a hydrolysis time of 40-120 minutes. The selected enzymes, or combination of enzymes, should also be chosen for reducing emulsions caused by high content of phospholipids in the raw material.

An efficient amount of proteolytic enzyme(s) will be set after a process- and product optimization process that depends upon the efficiency of a specific chosen commercial enzyme or mix of enzymes. A typical amount by weight of commercial enzymes, as a ratio of the amount of the weight of the disintegrated raw material, are preferably between 0.5% and 0.05%, more preferably between 0.3% and 0.07% and most preferable between 0.2% and 0.09%. This hydrolysis step is aided by endogenous (natural) enzymes because rapid and uncontrolled autolysis is well known in fresh caught crustaceans.

In one embodiment, the exogenous enzymes breakdown the proteinaceous material in the disintegrated substance as well as speed up and/or accelerate the hydrolysis of the material to avoid and/or preclude the leaking of fluoride from the shell, carapace and crust. These hydrolytic enzymes, or a combination of hydrolytic enzymes, should also be carefully chosen to reduce emulsion in the separation process. For example, such enzymes may be selected from exo- and/or endopeptidases. If a mixture of enzymes is used, such a mixture may also include one or more chitinases for subsequently making the chitin-containing fraction(s) more amenable to further downstream processing. If chitinases are used, care must be taken for not increasing the leakage of fluoride from the shell/crust/carapace of the crustacean into the other fractions. However, since such fluoride leakage takes time, it is possible to perform such an enzymatic treatment within the preferred time parameters. A more convenient alternative to including chitinases in the enzyme mix of the initial hydrolysis step will be to process the separated chitin-containing fraction subsequently to the separation step.

In one embodiment, the leaking of fluoride from the milled exo skeletal material into the milled fleshy material is avoided by completing the disintegration/hydrolozing steps within a time interval of 100 minutes, preferably within 60 minutes, most preferred within 45 minutes calculated from the addition of the endogenous enzyme(s). The amount of enzyme(s) added is related to the type of enzyme product used. As an example it may be mentioned that the enzyme alkalase may be added in an amount of 0.1-0.5% (w/w) of the raw material. This should be taken into context with the added endogenous enzymes since the addition of more enzymes will reduce the time interval of the hydrolytic step. Although it is not necessary to understand the mechanism of an invention, it is believed that a short hydroloysis duration reduces the diffusion time of fluoride from particles of the exoskeleton into the proteinaceous material.

Subsequent to, or together with, the hydrolytic processing step the hydrolyzed and distintegrated crustacean material is passed through a particle removal device operating through a gravitational force such as a longitudinal centrifuge (i.e., for example, a decanter). This first separation step removes the fine particles containing a considerable amount of the fluoride from the hydrolysed or hydrolysing crustacean material to create a solids fraction. The centrifuge is operated with a g force between 1,000 and 1,800 g, more preferably between 1,200 and 1,600 g and most preferably between 1,300 and 1,500 g. Through this particle removal step a substantial amount of fluoride is removed from the proteinaceous crustacean fraction. The reduction of fluoride on a dry weight basis as compared to conventional crustacean meal, with a typical fluoride content of 1,500 ppm, may be up to 50%, even more preferred up to 85%, most preferred up to 95%.

The enzymatic hydrolysis may be terminated by heating of the hydrolysing material (incubate) to a temperature over 90° C., preferably between 92-98° C. and most preferred between 92-95° C., prior to, during or after the separation step, as long as the hydrolysis duration lies within the above given boundaries. The hydrolysis is terminated before, during, or after the fine particle removal step, most preferred after the fine particle removal step. The temperature of the first centrifugation particle removal step, in one embodiment, depend on the optimal activity temperature of the enzyme (in the case where the enzymatic hydrolysis step is terminated by heating after the fine particle separation step).

The fluoride content in the prior art processed krill protein material (e.g., ~1,500 ppm) has limited applications and are less suitable for food or feed or corresponding food or feed additives. In one embodiment, removal of the fluoride content from the exoskeletal material may be followed by a further separation/purification of materials such as chitin, chitosan and astaxanthin. Such isolation procedures are known within the art. Steps may also be taken to further reduce the fluoride content from the isolated exoskeletal material using techniques including, but not limited to, dialysis, nanofiltration, electrophoresis or other appropriate technologies.

Hydrolytic enzyme(s) deactivation may be performed in different ways, such as adding inhibitors, removing co-factors (e.g., crucial ions through dialysis), through thermal inactivation and/or by any other deactivating means. Among these, thermal inactivation, is preferred by heating the proteinaceous material to a temperature where the hydrolytic enzymes become denatured and deactivated. However, if a product where the relevant native proteins are not denatured is wanted, other means than heating for deactivating the hydrolytic enzymes should be selected.

A first centrifugation forms a de-fluoridated hydrolyzed and disintegrated crustacean material fraction and a solids fraction (e.g., containing high fluoride exoskeleton particles). As described below, the low fluoride hydrolyzed and disintegrated crustacean material fraction may be subsequently separated (e.g., by a second centrifugation) to form a low fluoride phospholipid-peptide complex (PPC) composition fraction and a lean low fluoride concentrated hydrolysate fraction (CHF) fraction that can be used as a food and/or feed additives, and a lipid fraction mainly consisting of neutral lipids. The PPC composition subfraction is rich in lipids, like a smooth cream with no particles, wherein the lipids are well suspended within the peptide components. This suspension results in small density differences between the different PPC composition components thereby making it difficult to further separate the PPC composition with common centrifugal separators and/or decanters. This is especially accentuated with crustacean catches during the second half of the fishing season.

Ordinary disc centrifugal separators (i.e., generating rotational force in the X and Y plane) do not work properly to separate a PPC composition subfraction into its respective components since emptying and necessary cleaning cycles with water will disturb separation zones. Conventional centrifugation separation processes result in the formation of unwanted emulsion products having a high phospholipid (PL) content and low dry matter concentrations. Standard decanters cannot separate the PPC composition subfraction into its respective components due to a low g force limitation, short separation zone and an intermixing of light and heavy phases at the discharge of heavy phase from the machine.

Figure 2:
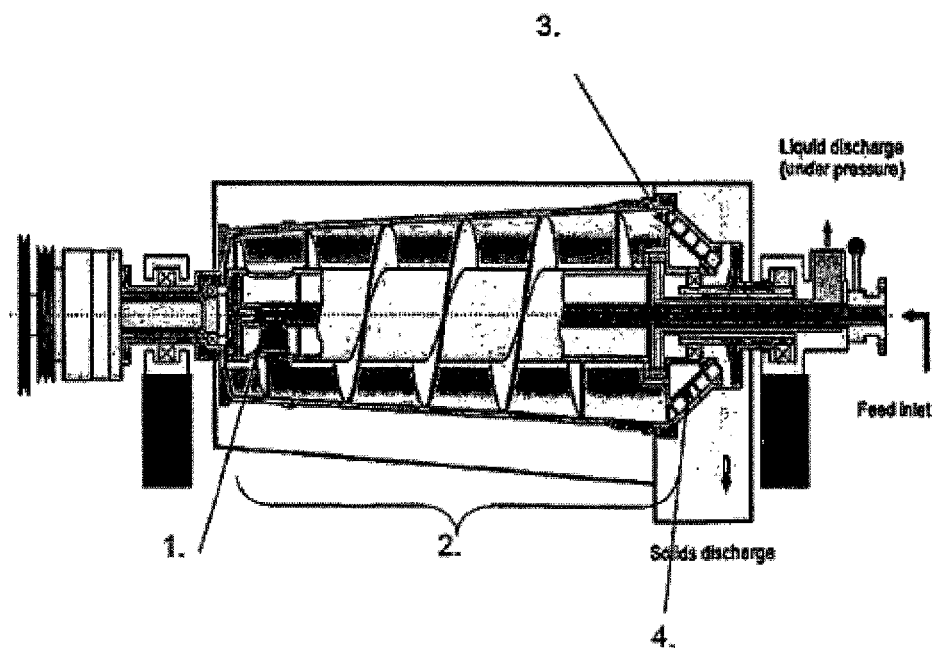
FIG. 2 presents a longitudinal centrifuge with an extended separation path. This specific example is a FLOTTWEG SEDICANTER horizontal decanter centrifuge.

In one embodiment, the present invention contemplates a method comprising separating a low fluoride PPC material into subfractions using a horizontal decanter centrifuge with an extended separation path. See, FIG. 2. Horizontal centrifuges (e.g., generating a rotational force in the Z plane) are useful for the present invention comprise modified convention decanter centrifuges. For example, a PPC composition subfraction would enter an ordinary decanter from a bowl through a central placed feed pipe in the middle of the separation zone. In contrast, when using horizontal centrifuges as contemplated herein, the PPC composition subfraction enters at the end and at the opposite side of the outlet (1). This modification provides a significant improvement in the separation process by providing a considerably longer clarification/separation zone than ordinary decanters and utilizes the total available separation length (2) of the machine. The drive is able to impart high g-forces: 10,000 g for small machines and 5,000 to 6,000 g for high capacity machines, facilitating the separation of very fine, slow-settling PPC composition subfractions without the complications of emulsification. The PPC composition subfraction will be subjected to the highest g-force just before entering under the baffle (3). The different liquid layers separated from PPC composition subfraction are concentrated gradually along the axis of the horizontal centrifuge thereby exiting the machine under baffle (3) by the g force pressure generated by the machine (4). The separation of the PPC composition subfraction into a layer comprising about 27-30% dry matter makes the downstream processing efficient in terms of operating/robustness and as well economically considering both yield and costs of preparing the dry matter into a meal composition. The PPC composition subfraction separation also creates a layer comprising a lean hydrolysate that can be evaporated into a concentrated hydrolysate of greater than 60%.

B. Processing of Krill

One embodiment according to the invention is depicted as a flow diagram for the processing of krill. See, FIG. 1. The function according to the method, or the process according to the invention is initiated immediately as a krill catch has been raised to the ship. Although it is not necessary to understand the mechanism of an invention, it is believed that fluoride immediately starts to leak/diffuse from the chitinous exoskeleton into the flesh and juices of the dead krills. "Immediately" means here a period at most 60 minutes, in practice, for example 15 minutes. During this period the krill catch is transferred from the trawl/net to a suitable disintegrator. In the disintegrator the krill material is crushed to relatively small particles. The disintegrating can be performed by any convenient method: pulping, milling, grinding or shredding. The temperature in the disintegration process is around the ambient temperature of the water, i.e. between −2° C. and +10° C., preferably between +0° C. and +6° C. The disintegration produces large amount of chitinous debris among the rest of the krill material, thereby contributing to a high fluoride content.

The particle size distribution of the disintegrated krill material is significant because of the above-mentioned fluoride leak from the chitinous debris and to the rest of the raw material. It is believed that the smaller particle sizes results in a more complete separation of the solids fraction from the disintegrated krill material. For this reason the preferable range of the particle size is 1.0-8 mm. However, the leaking process is relatively slow and has not time to be realized during the following process phases.

Next, fresh water is added to the disintegrated krill material (step 11). The volume/L of the water added is, for example, same as the weight/kg of the disintegrated krill material to be processed during the subsequent process phase of enzymatic hydrolysis. The temperature of the disintegrated krill material with the added water is increased such that it is suitable for the hydrolysis and enzyme(s) are added. The heating is carried out fast, within at most five minutes, after the disintegrating step to reduce the processing time and thereby to prevent diffusion of fluoride and to prepare the material for the enzymatic hydrolysis. The enzyme(s) can be added directly to the disintegrated krill material, or through the added water or both, before, during or after the heating step.

The term "hydrolysis" as used herein, means that breaks are made in the protein structure in the disintegrated substance, and the protein chains become shorter. This process is controlled by hydrolytic enzyme(s). For example, one or more exogenous proteolytic enzymes (e.g. alkalase, neutrase, and enzymes derived from microorganisms or plant species) may be used in the process. Co-factors such as specific ions can be added depending on the used enzymes. The selected enzyme(s) can also be chosen for reducing emulsions caused by high content of phospholipids in the raw material. Besides the temperature, the hydrolysis takes place within optimal or near-optimal pH and sufficient time (e.g., for example, the exogenous enzyme alkalase the optimum pH is about 8, optimum temperature about 60° C. and the hydrolysis time 40-120 minutes).

The amount of proteolytic enzyme(s) can be set after a process/product optimization, and depends naturally on the efficiency of the chosen enzyme or mix of enzymes. A typical ratio of the weight of added commercial enzymes to the weight of the disintegrated krill material is between 0.05% and 0.5%, preferably between 0.1% and 0.2%. Fresh caught krill is known for rapid and uncontrolled autolysis, or the destruction of the cells by endogenous (natural) enzymes, for which reason the treatment described here has to be proceeded without delays when the catch is not frozen.

The enzymatic hydrolysis also causes removing the bindings between the soft tissue of the hill and the exoskeleton. If a mixture of enzymes is used, the mixture may also include one or more chitinases to facilitate the further processing of the chitin-containing fractions. Chitinases are enzymes that break down glycosidic bonds in chitin.

The enzymatic hydrolysis is finished within 100 minutes from the addition of the endogenous enzyme(s). The preferred duration Δt of the hydrolysis is shorter, for example 45 minutes (step 12). Relatively short hydrolysis duration is important, because in that case the diffusion of the fluoride from the exoskeleton particles to the other material is reduced.

The hydrolysis is stopped by deactivating the hydrolytic enzyme(s) (step 13). There are many ways to deactivate the enzymes. Here it is used the thermal one: the temperature of the enzymatically processed material is increased over 90° C., preferably between 92-98° C., in which case the hydrolytic enzymes become denatured. In practice the deactivating of the hydrolytic enzyme(s) can be performed also during or after the solid particle removal.

The solid particles (e.g., hill exoskeleton) are removed from the enzymatically hydrolyzed and disintegrated krill material by passage through a device based on the centrifugal force such as a conventional horizontal centrifuge and/or decanter (step 14). Although it is not necessary to understand the mechanism of an invention, it is believed that these solid particles, or solids, originate from the exoskeleton of hills and, as mentioned, contain a considerable amount of the fluoride. The decanter is operated with a force between 1,000 and 1,800 g, preferably between 1,300 and 1,500 g. Through this particle removal step a substantial amount of fluoride, more than 90%, is removed from the krill material. The temperature in the decanter is for example 90° C., and if the deactivation of the enzyme(s) is done after the removal of solids, the temperature in the decanter is then increased to e.g. 93° C.

Next, the hydrolyzed and disintegrated krill material with low fluoride content is modified by passage through an extended separation path horizontal centrifuge (i.e., for example, a sedicanter). See, FIG. 1 step 15, and FIG. 2. In the sedicanter, the hydrolyzed and disintegrated krill material, is separated into the valuable fatty portion, or PPC (phospholipid-peptide complex) material fraction, and a CHF portion (concentrated hydrolysate fraction).

The separation of hydrolyzed and disintegrated krill material into the PPC material is difficult because of the small density differences within the krill material. The sedicanter is a modified horizontal centrifuge including a long horizontal clarification/separation zone and generating high centrifugal forces (5,000 to 6,000 g). These features facilitate the separation of fine, slow-settling PPC without emulsification. The latter is a problem in the ordinary centrifuges with short separation zone and lower forces, and in which water is used in emptying and cleaning cycles. The dry matter concentration of PPC material, pressured out from the sedicanter, is about 27-30%.

The PPC material may be then dried to a meal to avoid the lipid oxidation. FIG. 1, step 16. The drying process is gentle with low temperature (0-15° C., preferably 2-8° C.) and inert conditions, which give a reduced oxidative stress on the long-chain poly-unsaturated omega-3 fatty acids. A lyophilisation process would also be suitable since this avoids an over-heating of the product.

The PPC krill meal, or more briefly PPC, is then packed in air tight bags under nitrogen atmosphere for later direct use and continuation process.

A typical mass balance of the processed raw lean Antarctic krill is shown below in Table I:

TABLE I

Typical Mass Balance Of Antarctic Krill

| Matter | From 500 kg raw krill + water | Dry weight |
| --- | --- | --- |
| Wet PPC material | 80 kg | 28% |
| PPC meal | 25 kg | 97% |
| Hydrolysate | 770 kg | 6% |
| CHF | 78 kg | 60% |
| Fluoride-containing particles | 45 kg | 40% |
| Neutral oils | <5 kg | |

The fluoride content, prior to separation, in hydrolyzed and disintegrated krill material is 1.2 g/kg, whereas, after separation, the PPC is at most 0.5 g/kg and typically 0.3 g/kg. Thus, about two thirds of the fluoride has been removed.

When the PPC is further processed, components may be isolated by an extraction. In this phase, a solvent may be used. FIG. 1, step 17. For example, to obtain krill oil from the PPC, supercritical $CO_2$ and/or ethanol may be utilized, either separately or in combination. The extraction process yields, in addition to the krill oil, a protein hydrolysate (step 18).

Compressing and heating a material (e.g., for example, carbon dioxide or dimethyl ether) to above its critical temperature and pressure results in a supercritical fluid. The density is intermediate between a liquid and a gas and can be varied as a function of temperature and pressure. Hence, the solubility of supercritical fluids can be tuned so that selective extractions can be obtained. Due to the gas like properties, rapid extractions can be accomplished compared to liquid extractions as the diffusion rates are higher. $CO_2$ is a commonly utilized supercritical fluid as its critical parameters can easily be reached. For example, one report has demonstrated a low yield of krill phospholipids by using supercritical fluid extraction at a pressure of 500 bar and a temperature of 100° C. Yamaguchi (1986). A second report provides data on specific process conditions, which include pressure and temperature ranges (e.g., 300 to 500 bar and 60 to 75° C.). These data are from a pilot scale process wherein an extraction of 84 to 90% of krill total lipids was achieved. Bruheim et al., United States Patent Application Publication Number 2008/0274203 (herein incorporated by reference).

Supercritical $CO_2$ is also non-flammable, cheap and inert, wherein such factors are relevant when considering industrial applicability. The inertness results in low grade of oxidation of labile compounds during extraction. $CO_2$ also has a low surface tension which is an advantage so that the extraction medium can penetrate the material efficiently. In order to extract more polar substances, the $CO_2$ can be mixed with a polar solvent such as ethanol. The level of modifier can be varied to provide extra selectivity as well.

Consequently, currently available industrial scale supercritical fluid extraction processes using high temperatures and pressures has resulted in a low extraction efficiency of conventional krill meal thereby providing an insufficient oil yield to provide a commercially feasible solution for krill extraction. Further, these currently available extraction processes do not solve the problems discussed herein regarding providing improved low fluoride meal and/or oil compositions.

Therefore, the improved solvent extraction methods described herein have been developed. In one embodiment, co-solvents are used with supercritical CO2 or supercritical dimethyl ether either alone or in various combinations of ethanol, hexane, acetone. For example, if ethanol is used alone as an extraction solvent, it has been observed that krill material is less selective than extraction with supercritical $CO_2$. Pronova et al., WO 2008/060163 A1. As a result, undesirable substances are extracted into the hill oil resulting in a need for additional post-extraction clean-up/processing. Further, ethanol-only extracted krill oil tends to have higher viscosity and darker color which is independent of astaxanthin content of the oil.

In some embodiments, the present invention contemplates methods that have unexpected findings including but not limited to: i) PPC was extracted using low pressures (i.e., for example, between approximately 177 to 300 bar) and low temperatures (i.e., for example, between approximately 33 and 60° C.); and ii) high yield of lipid extract was produced (data available). It appears that krill meal comprising hydrolyzed protein allows for easier extraction of the associated lipids in particular the phospholipid rich fraction of krill oil.

The data presented herein demonstrates that supercritical $CO_2$ was found to be a selective extraction method as it produced high purity extracts containing triglycerides, phospholipids and astaxanthin with minimal brown color and superior organoleptic quality as compared to krill oils produced by ethanol-only extraction and/or acetone+ethanol extraction. Brown color of krill oil is considered to be undesirable. The exact origin of the brown color is unknown but it is believed to be associated with oxidation of krill lipids during the manufacture of krill meal phospholipids and/or degradation of the carotenoid astaxanthin.

The properties of such a supercritical fluid can be altered by varying the pressure and temperature, allowing selective component extraction. Extraction conditions for supercritical $CO_2$ are above the critical temperature of 31° C. and critical pressure of 74 bar. Addition of modifiers may slightly alter these values. For example, neutral lipids and cholesterol can be extracted from egg yolk with $CO_2$ pressures up to 370 bar and temperature up to 45° C., while using higher temperature, e.g. 55° C., would result in increased rate of phospholipid extraction. $CO_2$ has a high industrial applicability because it is non-flammable, cheap and inert. The inertness results in low oxidation of labile compounds during extraction.

As mentioned, either supercritical $CO_2$ or supercritical dimethyl ether is fluid. Its density is intermediate between a liquid and a gas and can be varied as a function of temperature and pressure. Hence, the solubility of supercritical fluids can be tuned so that selective extractions can be obtained. Due to the gas-like properties, rapid extractions can be accomplished compared to liquid-extractions. In the present method the extraction is effective; even 95% of the krill oil existing in the PPC is separated. Although it is not necessary to understand the mechanism of an invention, it is believed that the phospholipids of the feed material are emdbded in a matrix of hydrolyzed protein which means that the close association between the phospholipids and hydrophobic/phosphorylated proteins is broken thus facilitating the extraction of the lipids. In addition, a minimal amount of fluoride content is transferred to oil during the $CO_2$ extraction process. For example, the fluoride content of PPC is about 0.3 g/kg, but after the $CO_2$ extraction the fluoride content of the krill oil is less than 0.5 mg/kg.

Alternatively, when using only supercritical $CO_2$ as solvent, triglycerides and/or neutral oil may be separated from the PPC composition subfraction. FIG. 1, step 19. In one embodiment, supercritical $CO_2$-only extraction also generates a low fluoride 'de-oiled PPC' composition. Although it is not necessary to understand the mechanism of an invention, it is believed that de-oiled PPC is the most valuable portion of the PPC composition subfraction. When thereafter, the de-oiled PPC composition may be extracted using ethanol as a solvent, wherein a phospholipid subfraction and a protein hydrolysate fraction is also generated. See, FIG. 1, step 1A.

Figure 3:
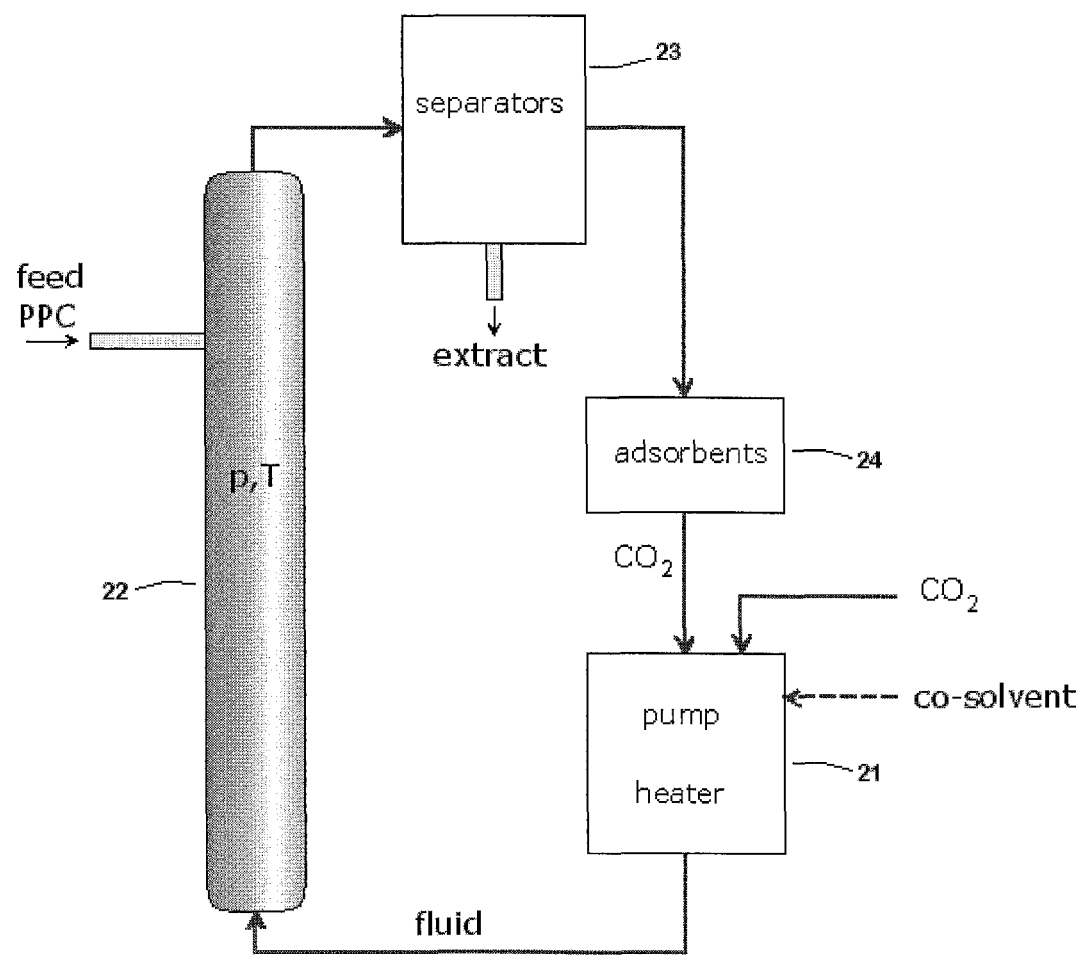
FIG. 3 depicts one example of an extraction plant suitable for use in the presently disclosed method. For example, the plant comprises a solvent unit (21), an extraction tank (22), separators (23) and adsorbents (24).
Figure 4:
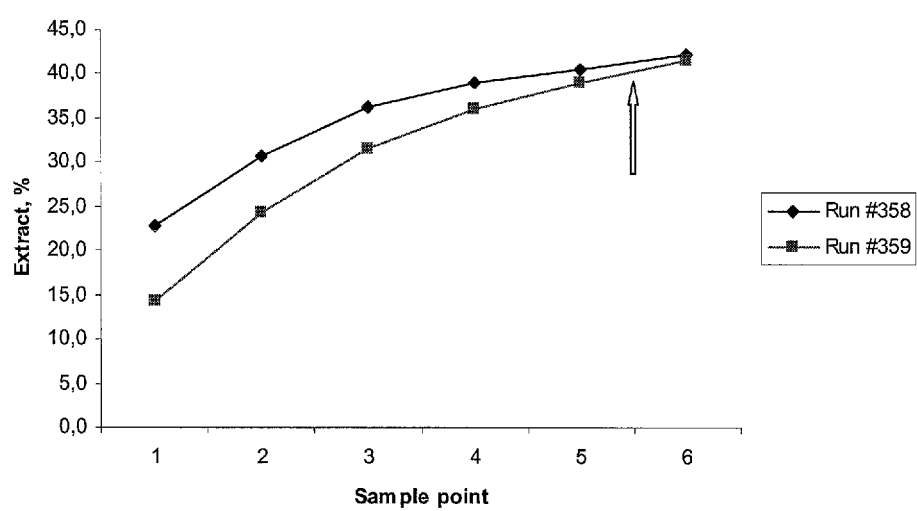
FIG. 4 present exemplary data showing the extraction efficiencies of two different runs in accordance with one embodiment of the present invention.

In one embodiment, the present invention contemplates a system comprising an extraction plant, including but not limited to, a solvent unit 21, vertical tank 22, separators 23 and adsorbents 24. See, FIG. 3. Normal $CO_2$ and possible co-solvent are fed to the solvent unit, which comprises a pump to generate a certain pressure (p) and a heater to generate a certain temperature (T). The supercritical $CO_2$ with possible co-solvent are then fed to the lower end of the tank 22. The feed material, in this case the PPC, is fed to the tank by means of a pump. Material affected by the solvent flows out of the upper end of the tank. The separators 22 separate the extract result, for example krill oil, to output of the system. If ethanol is used as co-solvent, it follows the extract proper and has to be evaporated away. The $CO_2$ continues its circulation to adsorbents 23, where it is cleaned, and thereafter back to the solvent unit 21.

In one embodiment, the present invention contemplates low fluoride PPC compositions including, but not limited to, polar lipids (~43% w/w) and/or neutral lipids (~46% w/w). For example, the PPC neutral lipids may range between approximately 40-50% (w/w). In one embodiment, the polar lipids include, but are not limited to, phosphatidylethanoamine (~3% w/w), phosphatidylinositol (~<1% w/w), phosphatidylserine (~1% w/w), phosphatidylcholine (~38% w/w) and/or lysophosphatidylcholine (~2% w/w). In one embodiment, the neutral lipids include, but are not limited to triacylglycerol (~40% w/w), diacylglycerol (~1.6% w/w), monoacylglycerol (~<1% w/w), cholesterol (~2% w/w), cholesterol esters (~0.5% w/w), free fatty acids (~2% w/w) and fat (~48% w/w). In one embodiment, the neutral lipid fat comprises approximately 75% fatty acids. In one embodiment, the neutral lipid fat fatty acids include, but are not limited to, saturated fatty acids (~28% w/w), monenoic fatty acids (~22% w/w), n-6 polyunsaturated fatty acids (~2% w/w) and/or n-3 polyunsaturated fatty acids (~26% w/w). See, Example XIII.

Phospholipid profiles have been created to evaluate low fluoride krill oil extracted by the methods described herein. For example, nuclear magnetic resonance technology has determined that phosphatidylcholine is the largest phospholipid component of krill oil and its proportion is relatively stable. Several krill oil samples underwent independent analysis. See, Example XII. In one embodiment, the present invention contemplates a low fluoride krill oil comprising approximately 39-52% (w/w) phospholipids. In one embodiment, the phospholipids comprise phosphatidylcholine ranging between approximately 65-80% (w/w). In one embodiment, the phospholipids comprise alkyl acyl phosphatidylcholine ranging between approximately 6-10% (w/w). In one embodiment, the phospholipids comprise phosphatidylinositol ranging between approximately 0.3-1.6% (w/w). In one embodiment, the phospholipids comprise phosphatidylserine ranging between approximately 0.0-0.7% (w/w). In one embodiment, the phospholipids comprise lysophosphatidylcholine ranging between approximately 2.4-19% (w/w). In one embodiment, the phospholipids comprise lyso acyl alkyl phosphatidylcholine ranging between approximately 0.6-1.3% (w/w). In one embodiment, the phospholipids comprise phosphatidylethanolamine ranging between approximately 1.4-4.9% (w/w). In one embodiment, the phospholipids comprise alkyl acyl phosphatidylethanolamine ranging between approximately 0.0-2.1% (w/w). In one embodiment, the phospholipids comprise a combination of cardiolipin and N-acylphosphatidylethanolamine ranging between approximately 1-3% (w/w). In one embodiment, the phospholipids comprise lysophosphatidylethanolamine ranging between approximately 0.5-1.3% (w/w). In one embodiment, the phospholipids comprise lyso alkyl acyl phosphatidylethanolamine ranging between approximately 0.0 and 0.3% (w/w).

As described above, the non-polar solvent extraction of a low fluoride crustacean oil results in the production of a low fluoride de-oiled phospholipid-protein complex composition (de-oiled PPC). Although it is not necessary to understand the mechanism of an invention, it is believed that the low fluoride de-oiled phospholipid-protein complex comprises a fluoride content similar to the low fluoride PPC complex (e.g., between approximately 200-500 ppm). A component analysis of de-oiled PPC includes, but is not limited to, polar lipids (~69% w/w) and/or neutral lipids (~20% w/w). In one embodiment, the polar lipids include, but are not limited to, phosphatidylethanoamine (~4.2% w/w), phosphatidylinositol (~<1% w/w), phosphatidylserine (~<1% w/w), phosphatidylcholine (~62% w/w) and/or lysophosphatidylcholine (~2% w/w). In one embodiment, the neutral lipids include, but are not limited to triacylglycerol (~17% w/w), diacylglycerol (~0.6% w/w), monoacylglycerol (~<1% w/w), cholesterol (~1% w/w), cholesterol esters (~0.5% w/w), free fatty acids (~1% w/w) and fat (~35% w/w). In one embodiment, the neutral lipid fat comprises approximately 69% fatty acids. In one embodiment, the neutral lipid fat fatty acids include, but are not limited to, saturated fatty acids (~21% w/w), monenoic fatty acids (~13% w/w), n-6 polyunsaturated fatty acids (~2% w/w) and/or n-3 polyunsaturated fatty acids (~31% w/w). See, Example IX.

III. Production of Low Trimethyl Amine Crustacean Materials

Trimethylamine (TMA) is an organic compound comprising a chemical formula of $N(CH_3)_3$. TMA is a colorless, hygroscopic, and flammable tertiary amine that may have a strong "fishy" odor in low concentrations and an ammonia-like odor at higher concentrations. TMA may be produced commercially and is also a natural by-product of plant and/or animal decomposition. It is the substance mainly responsible for the odor often associated with rotting fish, some infections, and bad breath. It is also associated with taking large doses of choline and carnitine.

Chemically, TMA comprises a nitrogenous base and can be readily protonated to give trimethylammonium cation. Trimethylammonium chloride is a hygroscopic colorless solid prepared from hydrochloric acid. Trimethylamine is a good nucleophile, and this reaction is the basis of most of its applications.

Trimethylamine N-oxide (TMAO) is an organic compound comprising a formula $(CH_3)_3NO$. This colorless solid is usually encountered as the dihydrate. TMAO is an oxidation product of TMA, a common metabolite in animals. TMAO is also an osmolyte found in saltwater fish, sharks and rays, molluscs, and crustaceans. Further, TMAO may function as a protein stabilizer that may serve to counteract urea, the major osmolyte of sharks, skates and rays. TMAO has high concentration in deep-sea fishes and crustaceans, where it may counteract the protein-destabilizing effects of pressure. Yancey, P. "Organic osmolytes as compatible, metabolic, and counteracting cytoprotectants in high osmolarity and other stresses" *J. Exp. Biol.* 208(15):2819-2830 (2005). TMAO decomposes to trimethylamine (TMA), which is the main odorant that is characteristic of degrading seafood.

Removal of TMA/TMAO compounds from crustacean products confers a useful advantage in that these compounds contribute to the strong, unpleasant smell of crustacean oils. Consequently, low TMA/TMAO compounds have an improved industrial applicability as compared to traditionally prepared crustacean oils.

In one embodiment, the present invention contemplates a method comprising extracting a low fluoride protein peptide complex (PPC) is a suitable raw material for krill oil production by extraction with any combination of solvents including, but not limited to, ethanol, acetone, ethyl acetate, carbon dioxide, or dimethyl ether to produce a low fluoride-low trimethyl amine crustacean product. In one embodiment, the low fluoride-low trimethyl amine crustacean product comprises an oil. In one embodiment, the low fluoride-low trimethyl amine crustacean produce comprises a de-oiled PPC.

Dimethyl ether (DME) has been previously reported as an extraction solvent for polyunsaturated fatty, but not for the preparation of low TMA products. Catchpole et al. "Extraction Of Highly Unsaturated Lipids With Liquid Dimethyl Ether" WO 2007/136281. When DME is in a supercritical form, the solvent has sufficient solvent power to extract phospholipids resulting in rapid and gentle extractions. DME can be used on wet raw materials and can be operated at low pressures as compared to other supercritical fluids such as $CO_2$. In one embodiment, the present invention contemplates a crustacean extraction product comprising krill oils with a low TMA/TMAO crustacean oil. In one embodiment, the low TMA/TMAO crustacean oil is a krill oil.

IV. Formulated Compositions

In some embodiments, the present invention contemplates compositions comprising low fluoride crustacean PPC or compositions comprising low fluoride crustacean de-oiled PPC compositions and/or protein hydrolysates as described herein. In one embodiment, the compositions comprises mixtures of the crustacean PPC complex, crustacean de-oiled PPC and the protein hydrolysates in any combination. Although it is not necessary to understand the mechanism of an invention, it is believed that the mixed ratio can be any ratio but is preferably a ratio of approximately 1:1. In one embodiment, the mixture comprises a milled fine powder. In one embodiment, the powder has a particle size of approximately 250 µm. In one embodiment, the compositions have improved stability because of lower peroxide (e.g., <0.1%; mEq/kg) and/or aniside levels (<0.1%; w/w). In one embodiment, the compositions have improved stability because of lower microbiological contamination. In one embodiment, the composition further comprises microencapsulated polyunsaturated Omega-3 fatty acids. In one embodiment, the composition further comprises zinc oxide. In one embodiment, the composition further comprises marine peptides. In one embodiment, the composition further comprises at least one supplemental amino acid.

In some embodiments, the present invention contemplates a method for formulating a composition comprising a low fluoride crustacean PPC and/or a low fluoride crustacean de-oiled PPC and/or a protein hydrolysate as described herein. In one embodiment, the composition is a powder. In one embodiment, the composition is a tablet. In one embodiment, the composition is a capsule. In one embodiment, the method further comprises mixing the powder with a food product. In one embodiment, the mixing further comprises a microencapsulated polyunsaturated Omega-3 fatty acids. In one embodiment, the mixing further comprises zinc oxide. In one embodiment, the mixing further comprises marine peptides. In one embodiment the mixing further comprises at least one supplemental amino acid.

EXPERIMENTAL

Example I

Production of Low Fluoride Krill Oil

The feed material, 'Emerald krill meal' granules (Olymeg® or low fluoride PPC prepared as described herein), were supplied in a sealed plastic bag containing approximately 25 kg. The feed material was kept frozen until used in extractions. The granules have a size distribution typically in the range 2 to 5 mm, but a number of fine fragments were also present. The granules are greasy to the touch but still break up under compression rather than smear.

5 kg batches of feed material in granular form, as processed using supercritical $CO_2$ as solvent and azeotropic food grade ethanol as co-solvent, the weight of the ethanol being 23% of the weight of $CO_2$. The plant was prepressurised to operating pressure with $CO_2$ only, and ethanol was added when $CO_2$ circulation started. Solvent to feed material ratio was 25:1 or greater and co-solvent to feed material ratio was 5:1. Runs were carried out under two extraction conditions; 300 bar at 60° C., and 177 bar at 40° C. See, Table II.

TABLE II

Krill Oil Extraction Conditions

| | Run 1 | Run 2 |
|---|---|---|
| Feed Mass (g, as received) | 5000.5 | 5000.9 |
| Extraction pressure (bar) | 300 | 177 |
| Extraction temperature (° C.) | 60 | 33 |
| First separator pressure (bar) | 90 | 90 |
| First separator temperature (° C.) | 41 | 41 |
| Second separator pressure (bar) | 48-50 | 48-50 |
| Second separator temperature (° C.) | 39 | 39 |
| $CO_2$ used with ethanol co-solvent (kg) | 132.6 | 134.9 |
| Additional $CO_2$ at end of run (kg) | 33.1 | 44.5 |
| Total ethanol used (kg) | 31.65 | 32.19 |

The extracted krill oil material was passed through two separation vessels in series, held at 90 bar and 45-50 bar respectively. The final krill oil material collected from both separators was pooled together and the ethanol was evaporated. The residual feed material comprises a de-oiled feed material (e.g., for example, de-oiled PPC) having a reduced lipid content in comparison to the starting feed material. See, Example IX.

After ethanol evaporation, krill oil cumulative extraction curves were generated for both Run 1 and Run 2 by independently analyzing each sample taken during the extraction runs. See, Table III

TABLE III

Progressive krill oil extraction sample points and yields.

| Sample Number | 1 | 2 | 3 | 4 | 5 | 6 | Total |
|---|---|---|---|---|---|---|---|
| Run 1 | | | | | | | |
| Cumulative $CO_2$ (kg/kg feed) | 5.5 | 9.1 | 13.4 | 17.8 | 22.0 | 33.1 | 33.1 |
| Extracted oil (g, dry) | 1137 | 398 | 282 | 135 | 78 | 86 | 2115 |
| Run 2 | | | | | | | |
| Cumulative $CO_2$ (kg/kg feed) | 5.6 | 9.1 | 13.5 | 17.5 | 21.5 | 34.4 | 34.4 |
| Extracted oil (g, dry) | 715 | 496 | 368 | 220 | 149 | 129 | 2077 |

A total yield of 41-42 wt % of the feed material was achieved for all runs. The runs carried out at 300 bar and 60° C. had a higher initial rate of extraction. The curves indicate that the extraction is virtually complete at Sample Number 5 after a cumulative $CO_2$ use ranging between 21.5-22.0 kg per kg of feed material. Estimated maximum extraction is achieved at a point where the $CO_2$:feed ratio is 26.5:1. See, FIG. 3 (estimated maximum extraction is marked by an arrow). The ratio of azeotropic ethanol to $CO_2$ was 0.24:1 for the 300 bar runs, and slightly higher at 0.26:1 for the lower pressure run.

This method of krill oil production resulted in the near complete extraction of total lipids from the krill meal (e.g., for example, approximately 95% of neutral lipids and 90% of phospholipids. The final yield was similar for both the high and low pressure runs, but neutral lipids were more rapidly extracted at higher pressure. The phospholipid extraction rate was similar under both extraction conditions. As detailed below, in this extraction process, the pooled krill oil total lipid had an overall phospholipid level of just over 40 wt % and both phosphatidyl inositol and phosphatidyl serine were poorly extracted.

Phospholipid profiles of the various krill material compositions were then determined using traditional column chromatography techniques. See, Table IV.

TABLE IV

Comparative Phospholipid Profiles Of Krill Compositions (run 1)

| Sample | Olymeg 10071199 | Extract 1 | Extract 2 | Extract 3 | Extract 4 | Extract 5 | Extract 6 | Residue (Top) | Residue (Bottom) |
|---|---|---|---|---|---|---|---|---|---|
| | | | | Wt % of total PL | | | | | |
| PC | 70.1 | 80.4 | 77.1 | 76.9 | 75.9 | 73.5 | 72.7 | 40.2 | 32.5 |
| AAPC | 8.5 | 8.0 | 9.0 | 9.8 | 9.1 | 10.6 | 9.0 | 7.5 | 7.8 |
| PI | 1.8 | | | | 0.7 | 0.6 | 0.6 | 6.2 | 10.1 |
| PS | 1.0 | | | | | | | 5.5 | 8.1 |
| LPC | 6.9 | 4.6 | 5.6 | 5.7 | 6.0 | 6.8 | 7.5 | 13.4 | 8.9 |
| LAAPC | 1.7 | 1.2 | 1.2 | 1.0 | 1.3 | 1.2 | 1.4 | 3.2 | 2.6 |
| PE | 5.3 | 3.6 | 4.0 | 3.5 | 3.8 | 3.5 | 4.5 | 9.4 | 9.4 |
| EPLAS | 0.6 | 0.0 | 0.5 | 0.5 | 0.5 | 0.5 | 0.3 | 1.0 | 2.2 |
| AAPE | 2.0 | 1.1 | 1.5 | 1.3 | 1.6 | 1.6 | 2.0 | 4.4 | 4.9 |
| LPS | | | | | | | | 0.7 | 1.9 |
| CL/NAPE | 1.0 | 0.9 | 0.7 | 0.8 | 0.8 | 1.2 | 1.6 | 4.2 | 5.7 |
| LPE | 0.8 | 0.3 | 0.4 | 0.4 | 0.4 | 0.4 | 0.4 | 3.2 | 4.5 |
| Total PL (wt % of lipid) | 40.88 | | | | | | | 81.46 | 80.96 |
| Lipid yield (wt %) | 44.7 | | | | | | | 4.9 | 5.9 |
| Total PL (wt % of sample) | 18.3 | 26.68 | 46.03 | 57.94 | 71.34 | 76.13 | 78.50 | 4.0 | 4.8 |

The first column shows the specific phospolipids that were analyzed. The second column show the phospholipid profile of the starting feed material (e.g., a low fluoride PPC prepared as described herein, or 'Olymeg®'). Columns three-eight (Extracts 1-6) show the phospholipid profile of each krill oil sample taken during the extraction process as described above. The last two columns show the phospholipid profile of the residual extracted feed material sampled from either the top and/or the bottom of the phospholipid extraction column.

The data show that the major phospholipid in the extracted krill oil samples is phosphatidyl choline (PC), ranging approximately from 72.7% to 80.4% of total phospholipids, including contributions from both alkyl acyl phosphatidyl choline (AAPC) and lyso phosphatidyl cholines (e.g., for example, LPC and/or LAAPC). Smaller amounts of phosphatidyl ethanolamine (PE) are present in both the feed material (column 1, ~5.3%) and in the krill oil extract samples (columns 3-8), ~3.5-4.5%). Alkyl acyl and lyso forms of PE (AAPE, LPE) are also present in the feed material and krill oil extracts. Phosphatidyl inositol (PI) and phosphatidyl serine (PS) are present in the feed material, but because they are poorly soluble in ethanol, these phospholipids are poorly extracted and are therefore concentrated in the extracted feed material residue (e.g., having a higher level in the residual PPC in comparison to the feed material, see columns 9 and 10).

Further analysis determined the overall relative lipid component proportions of the extracted krill oil. See, Figure V.

TABLE V

Main Lipid Components Of Extracted Krill Oil (% w/w)

| | TAG | Polar lipid | Sterols | FFA | Astaxanthin | Total lipid |
|---|---|---|---|---|---|---|
| Run 1 | 40.3 | 46.9 | 1.9 | ND | 0.05 | 92.2 |
| Run 2 | 42.1 | 50.2 | 2 | ND | 0.05 | 95.3 |

The data show: i) a relative absence of free fatty acids (FFAs); ii) less than 2% of sterols; iii) 40 wt % of triacylglycerides (TAGs); and iv) approximately 50% phospholipids (e.g., polar lipids). While FFA's were not detected (ND) in this particular example, it is believed that extracted krill oils may comprise between approximately 0.01-0.1% FFA of total lipids. As described above, the extraction process results a yield of between approximately 92.2-95.3% of the feed material total lipid.

The method and products according to the invention has been described above. The method can naturally vary in its details from those presented. The inventive idea may be applied in different ways within the limits as described herein.

Example II

Lipid Extraction Efficiency

This example demonstrates an exemplary analytical lipid extraction with the Soxhlet method comparing conventional krill meal with a low fluoride krill meal (e.g. low fluoride PPC) as described herein. Soxhlet method is a standard method in quantitative determination of fat content of foods and feeds and thus it can be used as a reference method to determine the extractability of various krill meals. For example, the Soxhlet method may be carried out as below using petroleum ether (boiling point 30-60° C.). Conventional krill meal was prepared as described in US 2008/0274203 (Aker Biomarine ASA, Bruheim et al.) and the low fluoride PPC was prepared according to the present invention.

The neutral lipids are often part of large aggregates in storage tissues, from which they are relatively easily extracted. The polar lipids, on the other hand, are present as constituents of membranes, where they occur in a close association with proteins and polysaccharides, with which they interact, and therefore are not extracted so readily. Furthermore, the phospholipids are relatively tightly bound with hydrophobic proteins and in particular with the phosphorylated proteins.

The data show that partial hydrolysis of the protein matrix in the preparation of a low fluoride PPC composition as described herein improves the extraction efficiency of total lipid by use of non-polar organic solvents (e.g., for example, supercritical $CO_2$, ethanol, and/or petroleum ether).

Briefly, a 10 g sample of either conventional milled krill meal or low fluoride PPC was weighed and placed in a Soxhlet apparatus and then continuously extracted for approximately eight (8) hours using 300 mL petroleum ether. After extraction, the solvent was evaporated at 60° C. under a nitrogen stream. Soxhlet F., "Die gewichtsanalytische bestimmung des milchfettes" *Dingier's Polytech. J.* 232:461-465 (1879).

The results show that the proportion of residual (e.g., un-extracted) lipid was twice as large in the conventional krill meal compared to the low fluoride krill meal. See, Table VI.

TABLE VI

Lipid Extraction Efficiency Of Low Fluoride Krill Meals

| Source material | Extracted krill oil lipid | Source Material Residual lipid (e.g., de-oiled meal) |
|---|---|---|
| Conventional krill meal | 79.6% | 20.4% |
| Low fluoride krill meal | 88.9% | 11.1% |

Consequently, the lipid extraction methods described herein have provided an unpredictable and surprising result that provides a superior product because of a greatly improved extraction efficiency.

Example III

Determination of Fluoride Content

This example presents one method of determining fluoride content of krill products as fluoride by chemical analysis using an ion selective electrode.

A low fluoride PPC krill meal was prepared as described herein and extracted in accordance with Example I to create a low fluoride krill oil were analyzed for fluoride content and compared with conventional preparation processes. Briefly, the method disclosed herein removes, in most part, the krill exoskeleton from the krill meal thereby reducing the fluoride content. In contrast, the krill exoskeleton is included in the conventional krill meal thereby having relatively high levels of fluoride. Conventional processes are, for example, described in WO 2002/102394 (Neptune Technologies & Bioresources) and US 2008/0274203 (Aker Biomarine ASA).

The krill meals analyzed for fluoride content were produced by: i) a low fluoride method of present invention; and ii) a whole krill material produced by a conventional process. See, Table VII.

TABLE VII

Fluoride Content Comparison To Conventional Processes

| Analyzed Material | Low Fluoride Preparation | Conventional Preparation |
|---|---|---|
| Krill meal | 200-500 ppm | 1300 ppm |
| Krill oil | <0.5 ppm | ~3-5 ppm |

The data demonstrate that by removing the exoskeleton in the process of producing krill meal (e.g., the low fluoride preparation as disclosed herein), the fluoride content of the krill meal and the krill oil produced from the meal have a markedly reduced fluoride content (e.g., 3-10 fold reduction).

Example IV

Krill Oil Color Comparison

Krill oil has typically a strong red colour arising from the carotenoid astaxanthin present in the oil at levels varying from 50 ppm to 1500 ppm. Color of krill oil can be determined with a LabScan® XE spectrophotometer (Hunter Associates Laboratory, INC. Resbon, Va., USA) and reported in CIELAB colour scales (L*, a* and b* values). Deviation from the red colour of astaxanthin can occur when the krill biomass is processed at high temperature and under conditions that induce oxidation. Typical oxidation induced deviation in krill oil clear red color is an increase in the brownish hue. Brown color in krill oil arises from oxidation of lipids and formation of secondary and tertiary oxidation products with amino residues. This process is also called non-enzymatic browning.

Strecker degradation products and pyrroles are products of non-enzymatic browning that have been characterized in samples of krill oil. For example, polymerization of pyrroles results in formation of brown, melatonin like macromolecules. Furthermore, pyrrole content of krill oil can be determined spectroscopically with absorbance at 570 nm.

Samples of three krill oils will be examined for color. One produced by the method of the present invention, one produced from frozen krill by a method described in WO 2002/102394 (Neptune Technologies & Bioresources) and one extracted from dried krill meal with ethanol alone as described in US 2008/0274203 (Aker Biomarine ASA). It is to be found that krill oil produced by the method of the present invention has the lowest level of brown color determined spectrophotometrically by using CIELAB colour scales (L*, a* and b* values) and/or the lowest level of pyrroles determined spectroscopically.

Example V

Organoleptic Krill Oil Quality Determination

Organoleptic quality of krill oil is conventionally determined by chemical analysis of volatile nitrogenous compounds arising from the decomposition of krill proteins and trimethyl amine oxide (TMAO). Nitrogenous compounds analyzed are total volatile nitrogen (TVN) and trimethylamine (TMA). In simplified terms the level of nitrogenous compounds correlate with the level of spoilage in the raw material i.e. krill biomass used for extraction of the oil.

It has become evident that, in addition to the volatile nitrogenous compounds, a large number of volatile components with distinct odour contribute to the sensory properties of krill oil. Many of the volatile components arise from the oxidation of lipid and proteinaceous compounds of krill biomass. Thus, a method that limits the level of oxidative degradation in the krill biomass, will reduce the amount of volatile components in krill oil.

Assessment of the organoleptic quality of different types of krill oil is to be performed by a panel of trained individuals. The sensory properties to be determined include several pre-defined parameters of smell and taste. It is to be found that the novel krill oil has an improved sensory profile compared to the other oils tested. The other oils to be tested include one extracted from frozen krill by a method described in WO 2002/102394 (Neptune Technologies & Bioresources) and one extracted from dried krill meal with ethanol alone as described in US 2008/0274203 (Aker Biomarine ASA).

Example VI

Production of Low Trimethyl Amine Crustacean Products

This example describes one method to produce low TMA crustacean products using a krill meal material composition. One having ordinary skill in the art, upon reading this specification would understand that this krill meal material composition may have variable fluoride content, including fluoride contents below 0.5 ppm, in addition to the basic components described below. See, Table VIII.

TABLE VIII

Unextracted Krill Meal Composition

| Eicosapentaenoic Acid (EPA) | 11 g/100 g (11% w/w) |
| Docosahexaenoic acid (DHA) | 7 g/100 g (7% w/w) |
| Omega-3 Fatty Acids | 22.7 g/100 g (22.7% w/w) |
| Phospholipids (PLs) | 45 g/100 g (45% w/w) |
| Trimethylamine (TMA) | 44 mg N/100 g (0.044% w/w) |
| Trimethylamine oxide (TMAO) | 354 mg N/100 g (0.354% w/w) |

A krill oil may then be prepared from the krill meal using ethanol extraction as described above that has the basic components described below. See, Table IX.

TABLE IX

Krill Oil Components After Conventional Ethanol Extraction Of Krill Meal

| Parameter | Value |
|---|---|
| EPA | 11.5 g/100 g (11.5% w/w) |
| DHA | 6.5 g/100 g (6.5% w/w) |
| Omega-3 Fatty Acides | 22.1 g/100 g (22.1% w/w) |
| Phospholipids | 44 g/100 g (44% w/w) |
| Trimethylamine | 50 mg N/100 g (0.05% w/w) |
| Trimethylamineoxide | 216 mg N/100 g (0.216% w/w) |

Alternatively, krill oil was prepared by krill meal extraction at 40 bars and 40° C. using supercritical dimethyl ether (SC DME). The DME extract composition was dried on a Rotavapor® and then flushed with nitrogen. The components of the resultant dried composition is listed below. See, Table X.

TABLE X

Krill Oil Components After SC DME Extraction Of Krill Meal

| Parameter | Value |
|---|---|
| EPA | 10.4 g/100 g (10.4% w/w) |
| DHA | 6.8 g/100 g (6.8% w/w) |
| Omega-3 Fatty Acids | 21.7 g/100 g (21.7% w/w) |
| Phospholipids | 45.7 g/100 g (45.7% w/w) |
| Trimethyl amine | <1 mg N/100 g (<0.001% w/w) |
| Trimethylamine oxide | 20 mg N/100 g (0.02% w/w) |

These data clearly show that supercritical DME extraction of krill meal compositions result in a preferential 10-100 fold reduction of TMA and TMAO levels.

Example VII

Nuclear Magnetic Resonance Phospholipid Profiles of Low Fluoride Krill Oil

This example presents representative data of the phospholipid composition of low fluoride krill oils prepared by the methods described herein. See, Table XI.

TABLE XI

Phospholipids in Low fluoride krill oil analyzed using $^{31}$P NMR.

| Phospholipid (PL) | | wt % of total PL | g/100 g sample |
|---|---|---|---|
| Sample #1 (color; orange) | | | |
| Phosphatidylcholine | PC | 79.7 | 31.1 |
| Alkyl acyl phosphatidylcholine | AAPC | 9.9 | 3.9 |
| Phosphatidylinositol | PI | 0.8 | 0.3 |
| Phosphatidylserine | PS | 0.7 | 0.3 |
| Lysophosphatidylcholine | LPC | 2.4 | 1.0 |
| Lyso alkyl acyl phosphatidylcholine | LAAPC | 0.6 | 0.2 |
| Phosphatidylethanolamine | PE | 3.5 | 1.4 |
| Alkyl acyl phosphatidylethanolamine | AAPE | 0.5 | 0.2 |
| Cardiolipin + N-acylphosphatidylethanolamine | CL/NAPE | 1.1 | 0.4 |
| Lysophosphatidylethanolamine | LPE | 0.6 | 0.2 |
| Lyso alkyl acyl phosphatidylethanolamine | LAAPE | 0.2 | 0.1 |
| Total phospholipid content* | | | 39.0 g/100 g sample |
| | | | 39.5 g/100 g solids |
| Sample #2 (color; orange) | | | |
| Phosphatidylcholine | PC | 66.7 | 27.0 |
| Alkyl acyl phosphatidylcholine | AAPC | 6.9 | 2.8 |
| Phosphatidylinositol | PI | 0.9 | 0.4 |
| Phosphatidylserine | PS | | n.d. |
| Lysophosphatidylcholine | LPC | 18.9 | 7.7 |
| Lyso alkyl acyl phosphatidylcholine | LAAPC | 0.8 | 0.3 |
| Phosphatidylethanolamine | PE | 1.4 | 0.6 |
| Alkyl acyl phosphatidylethanolamine** | AAPE | | |
| Cardiolipin + N-acylphosphatidylethanolamine | CL/NAPE | 3.0 | 1.2 |
| Lysophosphatidylethanolamine | LPE | 1.2 | 0.5 |
| Lyso alkyl acyl phosphatidylethanolamine | LAAPE | 0.2 | 0.1 |
| Total phospholipid content* | | | 40.5 g/100 g sample |
| | | | 42.2 g/100 g solids |
| Sample #3 (color; orange) | | | |
| Phosphatidylcholine | PC | 72.3 | 31.1 |
| Alkyl acyl phosphatidylcholine | AAPC | 6.1 | 2.6 |
| Phosphatidylinositol | PI | 0.3 | 0.1 |
| Phosphatidylserine | PS | 0.2 | 0.1 |
| Lysophosphatidylcholine | LPC | 16.1 | 6.9 |
| Lyso alkyl acyl phosphatidylcholine | LAAPC | 0.8 | 0.3 |
| Phosphatidylethanolamine | PE | 1.8 | 0.8 |
| Alkyl acyl phosphatidylethanolamine** | AAPE | | |
| Cardiolipin + N-acylphosphatidylethanolamine | CL/NAPE | 1.2 | 0.5 |
| Lysophosphatidylethanolamine | LPE | 1.1 | 0.5 |
| Lyso alkyl acyl phosphatidylethanolamine | LAAPE | | n.d. |
| Total phospholipid content* | | | 43.0 g/100 g sample |
| | | | 45.1 g/100 g solids |
| Sample #4 (color; orange) | | | |
| Phosphatidylcholine | PC | 77.4 | 39.5 |
| Alkyl acyl phosphatidylcholine | AAPC | 8.9 | 4.6 |
| Phosphatidylinositol | PI | 0.9 | 0.5 |
| Phosphatidylserine | PS | 0.4 | 0.2 |
| Lysophosphatidylcholine | LPC | 5.5 | 2.8 |
| Lyso alkyl acyl phosphatidylcholine | LAAPC | 0.6 | 0.3 |
| Phosphatidylethanolamine | PE | 2.6 | 1.3 |
| Alkyl acyl phosphatidylethanolamine** | AAPE | 1.3 | 0.7 |
| Cardiolipin + N-acylphosphatidylethanolamine | CL/NAPE | 1.8 | 0.9 |

TABLE XI-continued

Phospholipids in Low fluoride krill oil analyzed using $^{31}$P NMR.

| Phospholipid (PL) | | wt % of total PL | g/100 g sample |
|---|---|---|---|
| Lysophosphatidylethanolamine | LPE | 0.5 | 0.3 |
| Lyso alkyl acyl phosphatidylethanolamine | LAAPE | 0.2 | 0.1 |
| | Total phospholipid content* | | 51.1 g/100 g sample |
| | | | 52.8 g/100 g solids |
| Sample #5 (color; orange) | | | |
| Phosphatidylcholine | PC | 65.5 | 26.8 |
| Alkyl acyl phosphatidylcholine | AAPC | 9.4 | 3.9 |
| Phosphatidylinositol | PI | 1.6 | 0.6 |
| Phosphatidylserine | PS | 0.7 | 0.3 |
| Lysophosphatidylcholine | LPC | 10.1 | 4.2 |
| Lyso alkyl acyl phosphatidylcholine | LAAPC | 1.3 | 0.5 |
| Phosphatidylethanolamine | PE | 4.9 | 2.0 |
| Alkyl acyl phosphatidylethanolamine | AAPE | 2.1 | 0.9 |
| Cardiolipin + N-acylphosphatidylethanolamine | CL/NAPE | 2.8 | 1.2 |
| Lysophosphatidylethanolamine | LPE | 1.3 | 0.5 |
| Lyso alkyl acyl phosphatidylethanolamine | LAAPE | 0.3 | 0.1 |
| | Total phospholipid content* | | 41.0 g/100 g sample |
| | | | 43.0 g/100 g solids | n.d. = not detected
*Sum of the identified phospholipid classes
**May contain some glycerophosphocholine (GPC)

These data are consistent with those obtained using traditional column chromatography techniques shown in Example I.

Example VIII

Lipid Compositional Analysis of Low Fluoride PPC Material

The example presents data showing the lipid compositional analysis of a low fluoride phospholipid-protein complex composition created by the methods described herein. Consequently, it would be expected that the fluoride content of the compositions described below are less than 500 ppm.

The PPC comprises approximately 46.7 g/100 g (e.g., ~47%) total fat, 11.8 g/100 g (e.g., ~12%) eicosapentaenoic Acid (EPA) and 6.7 g/100 g (e.g., ~7%) docosahexaenoic acid (DHA). The total lipid content of the PPC total fat was approximately 87.7% (w/w) and comprises between approximately 115-260 mg/kg astaxanthin and between approximately 35.2%-46.7% unextracted oil.

TABLE XII

Low Fluoride Krill PPC Fat: Neutral Lipid Content
(45.2% w/w of total fat): Sample Number 1MG

| Components | % (w/w) neutral lipid |
|---|---|
| Triacylglycerol | 38 |
| Diacylglycerol | 1.7 |
| Monoacylglycerol | <1 |
| Free fatty acids | 2.2 |
| Cholesterol | 2.4 |
| Cholesterol Esters | <0.5 |

TABLE XIII

Low Fluoride Krill PPC Fat: Neutral Lipid Content
(46.6% w/w of total fat): Sample Number 2MG

| Components | % (w/w) neutral lipid |
|---|---|
| Triacylglycerol | 41 |
| Diacylglycerol | 1.5 |
| Monoacylglycerol | <1 |
| Free fatty acids | 1.6 |
| Cholesterol | 1.8 |
| Cholesterol Esters | 0.6 |

TABLE IXV

Low Fluoride Krill PPC Neutral Lipids: Fatty Acid Content
(49.7% w/w of neutral lipids): Sample Number 1MG

| Components | % (w/w) neutral lipid |
|---|---|
| Saturated | 27.4 |
| Monoenoic | 21.9 |
| N-6 Polyunsaturated | 1.8 |
| N-3 Polyunsaturated | 22.7 |
| Total | 74.4 |

TABLE XV

Low Fluoride Krill PPC Neutral Lipids: Fatty Acid Content
(46.7% w/w of neutral lipid): Sample Number 2MG

| Components | % (w/w) neutral lipid |
|---|---|
| Saturated | 29.2 |
| Monoenoic | 21.6 |
| N-6 Polyunsaturated | 2.1 |
| N-3 Polyunsaturated | 23.3 |
| Total | 76.9 |

TABLE XVI

Low Fluoride Krill PPC Polar Lipid Content (42.6% w/w of total lipids): Sample Number 1MG

| Components | % (w/w) polar lipid |
| --- | --- |
| Phosphatidylethanolamine | 3.4 |
| Phosphatidylinositol | <1 |
| Phosphatidylserine | <1 |
| Phosphatidylcholine | 37 |
| Lyso Phosphatidylcholine | 2.3 |

TABLE XVII

Low Fluoride Krill PPC Polar Lipid Content (42.8% w/w of total lipids): Sample Number 2MG

| Components | % (w/w) polar lipid |
| --- | --- |
| Phosphatidylethanolamine | 2.5 |
| Phosphatidylinositol | <1 |
| Phosphatidylserine | <1 |
| Phosphatidylcholine | 39 |
| Lyso Phosphatidylcholine | 1.8 |

Example IX

Lipid Compositional Analysis of Low Fluoride De-Oiled PPC Material

The example presents data showing the lipid compositional analysis of a low fluoride de-oiled phospholipid-protein complex composition created by the methods described herein. Consequently, it would be expected that the fluoride content of the compositions described below are less than 500 ppm. The de-oiled PPC comprises approximately 35 g/100 g (e.g., ~35%) total fat, 16.6 g/100 g (e.g., ~17%) eicosapentaenoic Acid (EPA) and 10.0 g/100 g (e.g., ~10%) docosahexaenoic acid (DI-IA). The total lipid content of the de-oiled PPC total fat was approximately 87.7% (w/w) and comprises approximately 115 mg/kg astaxanthin and approximately 35.2% unextracted oil.

TABLE XVIII

Low Fluoride Krill De-Oiled PPC Fat: Neutral Lipid Content (20.1% w/w of total fat): Sample Number 3MG

| Components | % (w/w) Neutral Lipid |
| --- | --- |
| Triacylglycerol | 17 |
| Diacylglycerol | 0.6 |
| Monoacylglycerol | <1 |
| Free fatty acids | 1.1 |
| Cholesterol | 1.3 |
| Cholesterol Esters | <0.5 |

TABLE IXX

Low Fluoride Krill De-Oiled PPC Neutral Lipids: Fatty Acid Content (35.2% w/w of neutral lipids): Sample Number 3MG

| Components | % (w/w) Neutral lipid |
| --- | --- |
| Saturated | 21.3 |
| Monoenoic | 13.9 |
| N-6 Polyunsaturated | 2.1 |
| N-3 Polyunsaturated | 31.2 |

TABLE XX

Low Fluoride Krill PPC De-Oiled Polar Lipid Content (68.9% w/w of total fat): Sample Number 3MG

| Components | % (w/w) polar lipid |
| --- | --- |
| Phosphatidylethanolamine | 4.2 |
| Phosphatidylinositol | <1 |
| Phosphatidylserine | <1 |
| Phosphatidylcholine | 62 |
| Lyso Phosphatidylcholine | 2.2 |

Example X

Compositional an PPC/Protein Hydrolysate Mixtures

The example presents data showing the lipid compositional analysis of a low fluoride phospholipid-protein complex mixed with a protein hydrolysate composition created by the methods described herein in an approximate 60/40 ratio. It would be expected that the fluoride content of the compositions described below are less than 500 ppm. The mixture comprises between approximately 28-30 g/100 g (e.g., ~30%) total fat, approximately 98 mg/kg astaxantine esters, approximately less than 1 mg/kg astaxanthine, a peroxide level of less than 0.1%; (mEq/kg) and/or an ananiside level of less than 0.1% (w/w).

TABLE XXI

Low Fluoride PPC/Protein Mixture Fat: Neutral Lipid Content (28% w/w of total fat)

| Components | % (w/w) Neutral Lipid |
| --- | --- |
| Triacylglycerol | 34 |
| Diacylglycerol | 1.1 |
| Monoacylglycerol | <1 |
| Free fatty acids | 1.0 |
| Cholesterol | 1.9 |
| Cholesterol Esters | <0.5 |

TABLE XXII

Low Fluoride PPC/Protein Mixture Neutral Lipids: Fatty Acid Content

| Components | % (w/w) Neutral lipid |
| --- | --- |
| Saturated | 25.1 |
| Monoenoic | 19.2 |
| N-6 Polyunsaturated | 2.0 |
| N-3 Polyunsaturated | 24.9 |

TABLE XXIII

Low Fluoride PPC/Protein Mixture Polar Lipid Content

| Components | % (w/w) polar lipid |
| --- | --- |
| Phosphatidylethanolamine | 5.0 |
| Phosphatidylinositol | <1 |
| Phosphatidylserine | <1 |
| Phosphatidylcholine | 41 |
| Lyso Phosphatidylcholine | 1.4 |

We claim:

1. A krill oil composition comprising a clear red color, phospholipids, less than 1 mg N/100g trimethyl amine and less than approximately 0.02% (w/w) trimethyl amine oxide.

2. The krill oil composition of claim 1, wherein said clear red color is a result of a reduced pyrrole content, wherein said pyrrole content contributes a dark brown color.

3. The krill oil composition of claim 1, wherein said phospholipids are between approximately 39-52 wt %.

4. The krill oil composition of claim 1, further comprising triglycerides, neutral lipids, approximately 20-30 wt % polyunsaturated Omega-3 fatty acids, and at least approximately 0.8 wt % free fatty acids.

5. The krill oil composition of claim 1, further comprising astaxanthin, wherein the level of astaxanthin is at least approximately 40 mg/kg.

6. The krill oil composition of claim 1, further comprising astaxanthin, wherein the level of astaxanthin is at least approximately 100 mg/kg.

7. The krill oil composition of claim 1, wherein at least 3% (g/100g of said composition) of said phospholipids comprise alkyl acyl phosphatidylcholine, lyso alkyl acyl phosphatidylcholine, alkyl acyl phosphatidylethanolamine, and lyso alkyl acyl phosphatidylethanolamine.

8. The krill oil composition of claim 1, wherein at least 37% (g/100g of said composition) of said phospholipids comprise phosphatidylcholine, lysophosphatidylcholine, phosphatidylethanolamine, lysophosphatidylethanolamine, phosphatidylinositol and phosphatidylserine.

9. The krill oil composition of claim 8, wherein said phosphatidylethanolamine is at least 2wt % of said phospholipids.

10. The krill oil composition of claim 8, wherein said phosphatidylcholine and said alkyl acyl phosphatidylcholine comprise at least 70 wt % of said phospholipids.

11. The krill oil composition of claim 8, wherein said phosphatidylcholine and said alkyl acyl phosphatidylcholine comprise at least 75 wt % of said phospholipids.

12. The krill oil composition of claim 8, wherein said phosphatidylcholine and said alkyl acyl phosphatidylcholine comprise at least 85 wt % of said phospholipids.

13. The krill oil composition of claim 8, wherein said phosphatidylcholine and said alkyl acyl phosphatidylcholine comprise at least 90 wt % of said phospholipids.

14. The krill oil composition of claim 1, wherein said crustacean oil composition comprises less than 0.5 ppm fluoride.

* * * * *

EX PARTE REEXAMINATION CERTIFICATE (13026th)
United States Patent
Bruheim et al.

(10) Number: US 9,814,256 C1
(45) Certificate Issued: Sep. 17, 2025

(54) METHOD FOR PROCESSING CRUSTACEANS TO PRODUCE LOW FLUORIDE/LOW TRIMETHYL AMINE PRODUCTS THEREOF

(71) Applicant: OLYMPIC SEAFOOD AS, Fosnavaag (NO)

(72) Inventors: Inge Bruheim, Volda (NO); Mikko Griinari, Espoo (FI); Jon Reidar Ervik, Aalesund (NO); Stig Rune Remoy, Fosnavag (NO); Even Remoy, Fosnavaag (NO); John Cameron, Fosnavaag (NO)

(73) Assignee: RIMFROST TECHNOLOGIES AS

Reexamination Request:
No. 90/019,810, Jan. 13, 2025

Reexamination Certificate for:
Patent No.: 9,814,256
Issued: Nov. 14, 2017
Appl. No.: 14/370,324
PCT Filed: Dec. 21, 2012
PCT No.: PCT/IB2012/003004
§ 371 (c)(1),
(2) Date: Jul. 2, 2014
PCT Pub. No.: WO2013/102792
PCT Pub. Date: Jul. 11, 2013

Related U.S. Application Data

(63) Continuation-in-part of application No. 13/342,664, filed on Jan. 3, 2012, now Pat. No. 8,557,297, which is a continuation-in-part of application No. 13/063,488, filed as application No. PCT/NO2009/000322 on Sep. 14, 2009, now Pat. No. 8,758,829.

(51) Int. Cl.
| | |
|---|---|
| *A23L 17/40* | (2016.01) |
| *A23D 9/007* | (2006.01) |
| *A23D 9/013* | (2006.01) |
| *A23D 9/02* | (2006.01) |
| *A23J 1/04* | (2006.01) |
| *A23J 3/34* | (2006.01) |
| *A23K 20/158* | (2016.01) |
| *A23L 5/20* | (2016.01) |
| *A23L 17/00* | (2016.01) |
| *A23L 33/115* | (2016.01) |
| *A23L 33/18* | (2016.01) |
| *C11B 1/02* | (2006.01) |
| *C11B 1/10* | (2006.01) |

(52) U.S. Cl.
CPC .............. *A23L 17/40* (2016.08); *A23D 9/007* (2013.01); *A23D 9/013* (2013.01); *A23D 9/02* (2013.01); *A23J 1/04* (2013.01); *A23J 3/34* (2013.01); *A23K 20/158* (2016.05); *A23L 5/23* (2016.08); *A23L 5/25* (2016.08); *A23L 17/65* (2016.08); *A23L 33/115* (2016.08); *A23L 33/18* (2016.08); *C11B 1/025* (2013.01); *C11B 1/10* (2013.01); *C11B 1/104* (2013.01); *A23V 2002/00* (2013.01); *Y02P 20/54* (2015.11)

(58) Field of Classification Search
None
See application file for complete search history.

(56) References Cited

To view the complete listing of prior art documents cited during the proceeding for Reexamination Control Number 90/019,810, please refer to the USPTO's Patent Electronic System.

*Primary Examiner* — Alan D Diamond

(57) ABSTRACT

The present invention contemplates the creation of a low fluoride oil processed from a phospholipid-protein complex (PPC) formed immediately upon a (i.e., for example, krill) catch. Further, the oil may also have reduced trimethyl amine and/or trimethyl amino oxide content. The process comprises disintegrating the s into smaller particles, adding water, heating the result, adding enzyme(s) to hydrolyze the disintegrated material, deactivating the enzyme(s), removing solids from the enzymatically processed material to reduce fluoride content of the material, separating and drying the PPC material. Then, using extraction with supercritical $CO_2$ or supercritical dimethyl ether, and/or ethanol as solvents, krill oil, inter alia, is separated from the PPC. In the extraction the krill oil can be separated almost wholly from the feed material.

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-9 is confirmed.

Claims 10-14 are determined to be patentable as amended.

New claim 15 is added and determined to be patentable.

10. The krill oil composition of claim 8, *wherein at least 3% (g/100 g of said composition) of said phospholipids comprise alkyl acyl phosphatidylcholine, lyso alkyl acyl phosphatidylcholine, alkyl acyl phosphatidylethanolamine, and lyso alkyl acyl phosphatidylethanolamine, and* wherein said phosphatidylcholine and said alkyl acyl phosphatidylcholine comprise at least 70 wt % of said phospholipids.

11. The krill oil composition of claim 8, *wherein at least 3% (g/100 g of said composition) of said phospholipids comprise alkyl acyl phosphatidylcholine, lyso alkyl acyl phosphatidylcholine, alkyl acyl phosphatidylethanolamine, and lyso alkyl acyl phosphatidylethanolamine, and* wherein said phosphatidylcholine and said alkyl acyl phosphatidylcholine comprise at least 75 wt % of said phospholipids.

12. The krill oil composition of claim 8, *wherein at least 3% (g/100 g of said composition) of said phospholipids comprise alkyl acyl phosphatidylcholine, lyso alkyl acyl phosphatidylcholine, alkyl acyl phosphatidylethanolamine, and lyso alkyl acyl phosphatidylethanolamine, and* wherein said phosphatidylcholine and said alkyl acyl phosphatidylcholine comprise at least 85 wt % of said phospholipids.

13. The krill oil composition of claim 8, *wherein at least 3% (g/100 g of said composition) of said phospholipids comprise alkyl acyl phosphatidylcholine, lyso alkyl acyl phosphatidylcholine, alkyl acyl phosphatidylethanolamine, and lyso alkyl acyl phosphatidylethanolamine, and* wherein said phosphatidylcholine and said alkyl acyl phosphatidylcholine comprise at least 90 wt % of said phospholipids.

14. The krill oil composition of claim 1, wherein said [crustacean] *krill* oil composition comprises less than 0.5 ppm fluoride.

*15. The krill oil composition of claim 1, wherein said krill oil composition comprises 20-30 wt % polyunsaturated Omega-3 fatty acids.*

\* \* \* \* \*